US008472784B2

(12) United States Patent
Hamada et al.

(10) Patent No.: US 8,472,784 B2
(45) Date of Patent: Jun. 25, 2013

(54) RECORDING APPARATUS, RECORDING METHOD, AND RECORDING PROGRAM

(75) Inventors: Toshiya Hamada, Saitama (JP); Kenichiro Aridome, Kanagawa (JP); Atsushi Mae, Kanagawa (JP); Naoki Morimoto, Tokyo (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1176 days.

(21) Appl. No.: 11/695,205

(22) Filed: Apr. 2, 2007

(65) Prior Publication Data
US 2007/0248321 A1 Oct. 25, 2007

(30) Foreign Application Priority Data
Apr. 6, 2006 (JP) .................. 2006-105536

(51) Int. Cl.
*H04N 9/80* (2006.01)
(52) U.S. Cl.
USPC .......................... 386/248; 386/239
(58) Field of Classification Search
None
See application file for complete search history.

(56) References Cited

U.S. PATENT DOCUMENTS

| | | | |
|---|---|---|---|
| 2002/0135607 A1* | 9/2002 | Kato et al. | 345/716 |
| 2003/0228134 A1 | 12/2003 | Kim et al. | |
| 2004/0240848 A1 | 12/2004 | Seo et al. | |
| 2005/0090940 A1* | 4/2005 | Pajakowski et al. | 701/1 |
| 2005/0105888 A1 | 5/2005 | Hamada et al. | |
| 2005/0117880 A1 | 6/2005 | Seo et al. | |
| 2005/0264437 A1 | 12/2005 | Uesaka et al. | |
| 2006/0039255 A1 | 2/2006 | Seo et al. | |
| 2006/0123058 A1* | 6/2006 | Mercer et al. | 707/104.1 |
| 2006/0267995 A1* | 11/2006 | Radloff et al. | 345/530 |

FOREIGN PATENT DOCUMENTS

| | | |
|---|---|---|
| EP | 1 531 477 A1 | 5/2005 |
| EP | 1583098 A1 * | 10/2005 |
| JP | 2002-158972 | 5/2002 |
| JP | 2004-304767 | 10/2004 |
| JP | 2005-149638 | 6/2005 |
| WO | WO 2005/045840 A1 | 5/2005 |
| WO | WO 2005/050528 A2 | 6/2005 |

OTHER PUBLICATIONS

U.S. Appl. No. 11/695,946, filed Apr. 3, 2007, Hamada, et al.
U.S. Appl. No. 11/916,466, filed Dec. 4, 2007, Hamada, et al.
Office Action issued Feb. 22, 2011, in Japan Patent Application No. 2006-105536.

* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

To provide a recording apparatus for recording at least content data and reproducing control information for controlling reproducing of the content data. The apparatus includes: a recording unit recording content data on a recording medium; and a control unit making a control to generate, with respect to the content data recorded on the recording medium, a clip information file including clip information indicating attribute information on the content data, a PlayList file including a PlayList for calling the clip information, an object file including an object for reproducing the content data by calling the PlayList file, and an index file including an index table for calling the object. The control unit correlates a type, based on a purpose of creating the PlayList file, with the PlayList file as attribute information of the PlayList file so as to make a control to generate the type in the index file.

16 Claims, 28 Drawing Sheets

Fig. 8

| SYNTAX | DATA LENGTH (BITS) | MNEMONIC |
|---|---|---|
| index.bdmv { | | |
|     type_indicator | 8 * 4 | bslbf |
|     version_number | 8 * 4 | bslbf |
|     Indexes_start_address | 32 | uimsbf |
|     ExtensionData_start_address | 32 | uimsbf |
|     reserved_for_future_use | 192 | bslbf |
|     AppInfoBDMV() | | |
|     for (i=0; i<N1; i++) { | | |
|         padding_word | 16 | bslbf |
|     } | | |
|     Indexes() | | |
|     for (i=0; i<N2; i++) { | | |
|         padding_word | 16 | bslbf |
|     } | | |
|     ExtensionData() | | |
|     for (i=0; i<N3; i++) { | | |
|         padding_word | 16 | bslbf |
|     } | | |
| } | | |

Fig. 9

| SYNTAX | DATA LENGTH (BITS) | MNEMONIC |
|---|---|---|
| Indexes() { | | |
|     length | 32 | uimsbf |
|     FirstPlayback() { | | |
|         '01' | 2 | uimsbf |
|         reserved | 30 | bslbf |
|         HDAVC_Title_playback_type | 2 | uimsbf |
|         reserved | 14 | bslbf |
|         FirstPlayback_mobj_id_ref | 16 | uimsbf |
|         reserved | 8 * 4 | bslbf |
|     } | | |
|     TopMenu() { | | |
|         '01' | 2 | uimsbf |
|         reserved | 30 | bslbf |
|         '01' | 2 | uimsbf |
|         reserved | 14 | bslbf |
|         TopMenu_mobj_id_ref | 16 | uimsbf |
|         reserved | 8 * 4 | bslbf |
|     } | | |
|     number_of_Titles | 16 | uimsbf |
|     for (title_id=0; title_id < number_of_Titles; title_id++) { | | |
|         Title[title_id]() { | | |
|             '01' | 2 | uimsbf |
|             reserved | 46 | bslbf |
|             Title_mobj_id_ref[title_id] | 16 | uimsbf |
|             reserved | 8 * 4 | bslbf |
|         } | | |
|     } | | |
| } | | |

Fig. 10

| SYNTAX | DATA LENGTH (BITS) | MNEMONIC |
|---|---|---|
| MovieObject.bdmv { | | |
|     type_indicator | 8 * 4 | bslbf |
|     version_number | 8 * 4 | bslbf |
|     ExtensionData_start_address | 32 | uimsbf |
|     reserved_for_future_use | 224 | bslbf |
|     MovieObjects() | | |
|     for (i=0; i<N1; i++) { | | |
|         padding_word | 16 | bslbf |
|     } | | |
|     ExtensionData() | | |
|     for (i=0; i<N2; i++) { | | |
|         padding_word | 16 | bslbf |
|     } | | |
| } | | |

Fig. 11

| SYNTAX | DATA LENGTH (BITS) | MNEMONIC |
|---|---|---|
| MovieObjects() { | | |
|   length | 32 | uimsbf |
|   reserved | 32 | bslbf |
|   number_of_mobjs | 16 | uimsbf |
|   for (mobj_id=0; mobj_id<number_of_mobjs; mobj_id++) { | | |
|     MovieObject[mobj_id]() { | | |
|       TerminalInfo() { | | |
|         '1' | 1 | bslbf |
|         '0' | 1 | bslbf |
|         '0' | 1 | bslbf |
|         reserved | 13 | bslbf |
|       } | | |
|       number_of_navigation_commands[mobj_id] | 16 | uimsbf |
|       for (command_id=0; command_id<number_of_navigation_commands[mobj_id]; command_id++){ | | |
|         navigation_command[mobj_id][command_id] | 96 | bslbf |
|       } | | |
|     } | | |
|   } | | |
| } | | |

Fig. 12

| SYNTAX | DATA LENGTH (BITS) | MNEMONIC |
|---|---|---|
| ExtensionData() { | | |
|     length | 32 | uimsbf |
|     if(length !=0){ | | |
|         data_block_start_address | 32 | uimsbf |
|         reserved_for_word_align | 24 | bslbf |
|         number_of_ext_data_entries | 8 | uimsbf |
|         for (i=0; i<*number_of_ext_data_entries*; i++) { | | |
|             ext_data_entry() { | | |
|                 ID1 | 16 | uimsbf |
|                 ID2 | 16 | uimsbf |
|                 ext_data_start_address | 32 | uimsbf |
|                 ext_data_length | 32 | uimsbf |
|             } | | |
|         } | | |
|     for (i=0; i<L1; i++) { | | |
|         padding_word | 16 | bslbf |
|         padding_word | 16 | bslbf |
|     } | | |
|     data_block() | 32+ 8 * (length − data_block_start _address) | |
|     } | | |
| } | | |

Fig. 16

| SYNTAX | DATA LENGTH (BITS) | MNEMONIC |
|---|---|---|
| IndexExtensionData(){ | | |
|     type_indicator | 8 * 4 | uimsbf |
|     reserved | 8 * 4 | bslbf |
|     TableOfPlayLists_start_address | 32 | uimsbf |
|     MakersPrivateData_start_address | 32 | uimsbf |
|     reserved_for_future_use | 192 | bslbf |
|     UIAppInfoHDAVC() | | |
|     for(i=0; i< N1;i++) { | | |
|         padding_word | 16 | bslbf |
|     } | | |
|     TableOfPlayLists() | | |
|     for(i=0; i< N2;i++) { | | |
|         padding_word | 16 | bslbf |
|     } | | |
|     MakersPrivateData() | | |
|     for (i=0; i< N3;i++){ | | |
|         padding_word | 16 | bslbf |
|     } | | |
| } | | |

*Fig. 17*

| SYNTAX | DATA LENGTH (BITS) | MNEMONIC |
|---|---|---|
| TableOfPlayLists() { | | |
|     length | 32 | uimsbf |
|     number_of_PlayLists | 16 | bslbf |
|     for(i=0; i< number_of_PlayLists;i++){ | | |
|         PlayList_file_name | 8 * 5 | bslbf |
|         reserved_for_future_use | 6 | bslbf |
|         PlayList_attribute | 2 | uimsbf |
|         reserved_for_future_use | 16 | bslbf |
|         title_id_ref | 16 | uimsbf |
|     } | | |
| } | | |

Fig. 18

| VALUES OF PLAY LIST ATTRIBUTES | 1 | 2 | 3 |
|---|---|---|---|
| TYPES OF PLAY LISTS | REAL PLAY LIST | VIRTUAL PLAY LIST | MENU PLAY LIST |
| USAGE | REAL RECORDING<br>·FOR MOVING IMAGE PHOTOGRAPHING/RECORDING<br>·STILL IMAGE IS ALSO RECORDED AS MOVING IMAGE | NON-DESTRUCTIVE EDITING | AVAILABLE FOR ANYTHING ELSE OTHER THAN PLAY LIST CONFIGURING MENU, FIRST PLAYBACK AND TOP MENU |
| TITLE CONFIGURATION | MOVIE TITLE | MOVIE TITLE | MOVIE TITLE<br>INTERACTIVE TITLE |
| IG (INTERACTIVE GRAPHICS) | DISABLE | ENABLE (MULTIPLEXED IG OR NON-MULTIPLEXED IG) | ENABLE (MULTIPLEXED OR NON-MULTIPLEXED) |
| Application_type OF CLIP REFERENCED BY PLAY ITEM | 1 (MOVING IMAGE) | 1 (MOVING IMAGE)<br>2 (TIME-BASED SLIDE SHOW) | 1 (MOVING IMAGE)<br>2 (TIME-BASED SLIDE SHOW)<br>3 (MAIN PATH OF BROWSERABLE SLIDE SHOW) |
| COEXISTENCE OF Application_type IN PLAY LIST | ONLY 1 | ONLY 1<br>ONLY 2<br>COEXISTENCE OF 1 AND 2 | ONLY 1<br>ONLY 2<br>ONLY 3<br>COEXISTENCE OF 1 AND 2 |
| SUB-PATH | DISABLE | ENABLE (SubPath_type=3) | ENABLE (SubPath_type=2, 3) |
| Application_type OF CLIP REFERENCED BY SUB-PLAY ITEM | — | 5 (NON-MULTIPLEXED IG) | 4 (NON-MULTIPLEXED BGM FOR BROWSERABLE SLIDE SHOW)<br>5 (NON-MULTIPLEXED IG) |
| COMPATIBILITY(AT THE TIME OF EDITING USING ANOTHER EQUIPMENT) | NO DELETION | NO DELETION<br>THERE IS POSSIBILITY THAT SUB-PATH IS NOT REPRODUCED | THERE IS POSSIBILITY THAT DELETION OCCURS AT THE TIME OF EDITING |

RECORDING APPARATUS, RECORDING METHOD, AND RECORDING PROGRAM

CROSS REFERENCES TO RELATED APPLICATIONS

The present invention contains subject matter related to Japanese Patent Application JP 2006-105536 filed in the Japanese Patent Office on Apr. 6, 2006, the entire contents of which being incorporated herein by reference.

BACKGROUND OF THE INVENTION

1. Field of the Invention

The present invention relates to a recording apparatus, recording method, and recording program that are capable of recording data so as to have compatibility with a recording medium to be recorded by using a format having audio/video (AV) streams, reproducing control information indicative of a reproducing section, a reproducing sequence and the like of the AV streams, an object for specifying the reproducing control information, and a table in which a title for calling the object is described.

The present invention can be applied to a recording apparatus, recording method, and recording program that are capable of recording data so as to have compatibility with a "Blu-ray Disc Read-Only Format" that serves as a read-only format of Blu-ray Disc®, for example.

2. Description of the Related Art

In recent years, a Blu-ray Disc standard has been proposed as a standard for a disc-type recording medium that is recordable and removable from a recording/reproducing apparatus. In the Blu-ray Disc standard, a disc of 12 cm in diameter and 0.1 mm in cover layer thickness is used as a recording medium and a blue-violet laser of 405 nm in wavelength and an objective lens of 0.85 in numerical aperture are used as optical systems, thereby achieving a recording capacity of a maximum of 27 GB (Gigabytes). This makes it possible to record a BS digital high resolution broadcast in Japan for 2 hours or more without degrading an image quality.

Sources (supply sources) of audio/video (AV) signals to be recorded on this recordable optical disc are assumed to be those which use analog signals in accordance with analog television broadcasting as an example of the related art; and those which use digital signals in accordance with, for example, digital television broadcasting including a BS digital broadcasting. In the Blu-ray Disc standard, a standard defining a method for recording AV signals broadcast on these broadcasting has already been set.

On the other hand, activity of developing a read-only recording medium having a movie or music recorded therein in advance is underway as a current Blu-ray Disc derived standard. A digital versatile disc (DVD) has already been well known as a disc-shaped recording medium for recording a movie or music. A read-only optical disc under the Blu-ray Disc standard is greatly different from the existing DVD and is advantageous in that a high resolution picture can be recorded with a high image quality for 2 hours or more by utilizing a mass capacity and a high speed transfer speed of the Blu-ray Disc.

Hereinafter, a standard for a read-only recording medium for the Blu-ray Disc is referred to as a BD-ROM (Blu-ray Disc-Read Only Memory). In addition, a standard for a recordable recording medium for the Blu-Ray Disc is referred to as a BD-RE. Japanese Patent Application Laid-Open (JP-A) No. 2004-21886 describes the standard for the BD-ROM that serves as a read-only type Blu-ray Disc.

In the BD-ROM standard, video data is recorded in units of clips, and a reproducing section can be specified in a clip using a movie PlayList (MoviePlayList). Here, a set of data serving as unit, which is necessary to be reproduced continuously and synchronously i.e., reproduced in real time is guaranteed, is referred to as a clip. For example, video data that exists as one file on a recording medium is handled as a clip. The movie PlayList can specify a reproducing start point (IN point) and are producing endpoint (OUT point) for each of a plurality of clips and can specify a reproducing section and a reproducing sequence of each of the plurality of clips.

The movie PlayList (hereinafter, abbreviated as PlayList) is specified by a navigation command in a MovieObject (MovieObject), and then, reproduced. A reference to the MovieObject is enumerated in an index table as an entrance for a title. The index table is data that is first read when a disc is mounted on a player, and a user can see a title described in the index table when the disc is mounted.

In the BD-ROM standard, a design is made so as to arbitrarily set a reference relationship between clips and PlayLists. For example, reference can be made to a certain clip from two PlayLists that are different from each other in IN point and OUT point. Further, a reference relationship between titles and MovieObjects can also be arbitrarily set.

FIG. 1 schematically depicts an exemplary relationship among titles, MovieObjects and PlayLists based on the BD-ROM standard. When a disc is mounted on a player, a first playback (FirstPlayback) and a top menu (TopMenu) on an index table are read, and a trailer or a TopMenu is reproduced based on the MovieObjects described in the FirstPlayback or the TopMenu. A user can instruct reproduction of each title recorded on the disc from the TopMenu.

In this example of FIG. 1, a MovieObject #4 is specified by the FirstPlayback and TopMenu, a PlayList #100 and a PlayList #101 are referenced from MovieObject #4, and a menu screen of FirstPlayback and TopMenu is displayed.

In other words, this example of FIG. 1 is obtained as a scenario configuration such that a menu screen is first displayed by the MovieObject #4; when the display of the menu screen finishes, reproducing by the MovieObject #0 is started; if a title jump, for example, is selected while the menu screen is displayed, MovieObject #4 jumps to the Title #1; and then, reproduce by MovieObject #0 is started from the jumped title.

The TopMenu navigates reproduction of six titles: Title #1 to Title #6. Title #1 and Title #3 each instructs reproduction by MovieObject #0, and Title #4 and Title #6 each instructs reproduction by a MovieObject #2. In addition, a MovieObject #4 for reproducing the TopMenu jumps to Title #1 and jumps to MovieObject #0 referenced by Title #1. Further, a command for reproducing two PlayLists: PlayList #100 and PlayList #101 is described in MovieObject #0, and a command for reproducing three PlayLists: PlayList #4, PlayList #5, and PlayList #6 is described in a MovieObject #3.

As described above, in the BD-ROM standard, it is possible to instruct for reproduction by one MovieObject from a plurality of titles; possible to jump from one MovieObject to a title and a MovieObject; and possible to instruct from one MovieObject to a plurality of PlayLists. In this manner, there is an advantageous effect that an arbitrary reference relationship among titles, MovieObjects, and PlayLists can be made, thereby easily achieving intention of a content producer. Since a menu screen is configured using a navigation command in MovieObject, there is an advantageous effect that the configuration of the menu screen does not depend on equipment.

SUMMARY OF THE INVENTION

In the meantime, a DVD recorder for recording audio/video (AV) data in a recordable DVD by using a digital versatile disc-video (DVD-Video) standard defined for a read-only recording medium that has been existing in the related art. From this fact, it is expected that the BD-ROM standard currently being developed as a standard for a read-only recording medium will be used as one of the recording methods for commercially available recorders in the future. Therefore, the development of a standard such that the BD-ROM standard is extended for a recordable recording medium is underway.

Even in the case where the BD-ROM standard is extended for a recordable recording medium, a clip recorded on a disc needs to be reproduced when specified as a title from Top-Menu, which is reproduced in accordance with the description of the index table. In addition, in the recordable recording medium, there is a need for enabling title editing such as title deletion or addition. For example, if a clip is newly recorded on a recording medium, a title based on the clip is added. When the title is edited, a configuration of a TopMenu needs to be updated concurrently.

In the case where the BD-ROM standard is applied to the recordable recording medium, however, it has been extremely difficult to reflect the changed contents on a menu screen when a PlayList or a clip is changed by means of title editing.

That is, in the BD-ROM standard, a menu screen is configured using a navigation command in a MovieObject as described above. In other words, in the BD-ROM standard, a design chart, i.e., a program of the menu screen is recorded on a disc, so that a player can configure the menu screen in accordance with an instruction from this program. With this mechanism, a uniform menu screen can be displayed without depending on the player. On the other hand, this program should be analyzed to change the menu screen.

As described above, in the BD-ROM standard, a reference relationship among titles, MovieObjects, and PlayLists can be designed with high flexibility, and thus, a navigation command is made complicated.

If a recorder or an editor of the same device type is used, a design concept of a menu screen is inflexible. Thus, it is expected that a change of the menu screen is comparatively easy. In the case of changing a menu screen arbitrarily created using different device types, however, there is a need for analyzing a command configuring the menu screen or the like. The command analysis has been as difficult as analyzing a general program code to generate a source code.

As another example, buttons provided on the menu screen a reconfigured using graphics data. In the BD-ROM standard, the graphics data for displaying buttons is provided as a stream, which is recorded in a disc in advance, multiplexed with another item of data such as video data. In the case of newly adding a title, it is expected that a button, corresponding to the title, is newly added. In the case where a button to be newly added is created in a design analogous to that of an existing button, generally, bit map data for displaying a referenced button image is needed. Further, a layout of the existing buttons in the menu screen may have to be changed. Furthermore, a page of the menu screen may have to be added.

In the case where the existing BD-ROM standard is extended for a recordable recording medium as it is, update of the menu screen has not been realistic.

Therefore, it is desirable to provide a recording apparatus, recording method, and recording program that are capable of easily editing a menu screen in the case where the BD-ROM standard is extended for a recordable recording medium.

According to an embodiment of the present invention, there is provided a recording apparatus for recording at least content data and reproducing control information for controlling reproducing of the content data, the recording apparatus including: a recording unit which records content data on a recording medium; and a control unit which makes a control to generate, with respect to the content data recorded on the recording medium, a clip information file that includes clip information indicating attribute information on the content data, a PlayList file that includes a PlayList by calling the clip information, an object file that includes an object for reproducing the content data for calling the PlayList file, and an index file that includes an index table for calling the object, wherein the control unit correlates a type, based on a purpose of creating the PlayList file, with the PlayList file as attribute information of the PlayList file so as to make a control to generate the type in the index file.

According to another embodiment of the present invention, there is provided a recording method for recording at least content data and reproducing control information for controlling reproducing of the content data on a recording medium, the method including steps of: making a control to generate, with respect to the content data recorded on the recording medium, a clip information file that includes clip information indicating attribute information on the content data, a PlayList file that includes a PlayList for calling the clip information, an object file that includes an object for reproducing the content data for calling the PlayList file, and an index file that includes an index table for calling the object; and correlating a type, based on a purpose of creating the PlayList file, with the PlayList file as attribute information of the PlayList file so as to make a control to generate the type in the index file.

According to still another embodiment of the present invention, there is provided a recording program for causing a computer to execute a method for recording at least content data and reproducing control information for controlling reproducing of the content data on a recording medium, wherein the recording method includes: making a control to generate, with respect to the content data recorded on the recording medium, a clip information file that includes clip information indicating attribute information on the content data, a PlayList file that includes a PlayList for calling the clip information, an object file that includes an object for reproducing the content data for calling the PlayList file, and an index file that includes an index table for calling the object; and correlating a type, based on a purpose of creating the PlayList file, with the PlayList file as attribute information of the PlayList file so as to make a control to generate the type in the index file.

As described above, in the embodiments of the invention, control is made to generate, with respect to the content data recorded on the recording medium, a clip information file that includes clip information indicating attribute information on content data, a PlayList file that includes a PlayList for calling the clip information, an object file that includes an object for reproducing the content data by calling the PlayList file, and an index file that includes an index table for calling the object. In addition, a type, based on a purpose of creating the PlayList file, is correlated with the PlayList file as attribute information of the PlayList file so as to be controlled to generate the type in the index file. Accordingly, for example, in the case of editing a PlayList, each PlayList can be handled appropriately.

In the embodiments of the invention, as described above, a control is made to generate a clip information file that includes clip information indicating attribute information on content data, a PlayList file that includes a PlayList for calling the clip information, an object file that includes an object for reproducing the content data for calling the PlayList file, and an index file that includes an index table for calling the object, with respect to the content data recorded on a recording medium. Also, a type, based on a purpose of creating the PlayList file, is correlated with the PlayList file as attribute information of the PlayList file so as to be controlled to generate the type in the index file. Therefore, for example, in the case of editing a PlayList, a proper process can be applied every PlayList.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 8 is a schematic diagram depicting a syntax that represents an exemplary structure of a file "index.bdmv";

FIG. 9 is a schematic diagram depicting a syntax that represents an exemplary structure of a block Indexes ( );

FIG. 10 is a schematic diagram depicting a syntax that represents an exemplary structure of a file "MovieObject.bdmv";

FIG. 11 is a schematic diagram depicting a syntax that represents an exemplary structure of a block MovieObject ( );

FIG. 12 is a schematic diagram depicting a syntax that represents an exemplary structure of a block Extension Data ( );

FIG. 16 is a schematic diagram depicting a syntax that represents an exemplary structure of a block data_block( ) in a field ExtensionData ( ) contained in a file "index.bdmv";

FIG. 17 is a schematic diagram showing a syntax that represents an exemplary structure of a block TableOfPlayLists ( );

FIG. 18 shows an example meaning of each of the attributes of PlayLists;

DETAILED DESCRIPTION OF THE INVENTION

Hereinafter, one embodiment of the present invention will be described with reference to the accompanying drawings. For the sake of clear understanding, a brief description regarding to Blu-ray Disk will be given to an applicable part of "Blu-ray Read Only Format Ver 1.0 Part 3 Audio Visual Specifications" specifying a structure of managing contents, i.e., audio/video (AV) data, that are recorded on a BD-ROM serving as a read-only type Blu-ray Disc when the BD-ROM standard is extended for a recordable recording medium. In the following description, the management structure in the BD-ROM is referred to as a BDMV format. In addition, a format extended for a recording medium capable of recording a BDMV format is referred to as an extended BDMV format for the sake of convenience.

For example, a bit stream encoded in an encoding scheme such as an MPEG (Moving Pictures Experts Group) video scheme or an MPEG audio scheme and multiplexed in accordance with an MPEG2 system is referred to as a clip AV stream (or AV stream). The clip AV stream is recorded as a file in a disc by means of a file system defined in "Blu-ray Disc Read Only Format part 2" that is one of the standards relevant to Blu-ray Disc. This file is referred to as a clip AV stream file (or AV stream file).

The clip AV stream file is a management unit on the file system, and is not always a management unit that is easily understandable to a user. Considering the user convenience, there is a need for a mechanism for collectively reproducing video contents divided into a plurality of clip AV stream files, a mechanism for reproducing only a part of the clip AV stream file, and further, and information for smoothly carrying out specific reproducing or initial reproducing is needed to be recorded on a disc as a database. The database is specified in "Blu-ray Disc Read Only Format part 31" that is one of the standards relevant to Blu-ray Disc.

Figure 2:
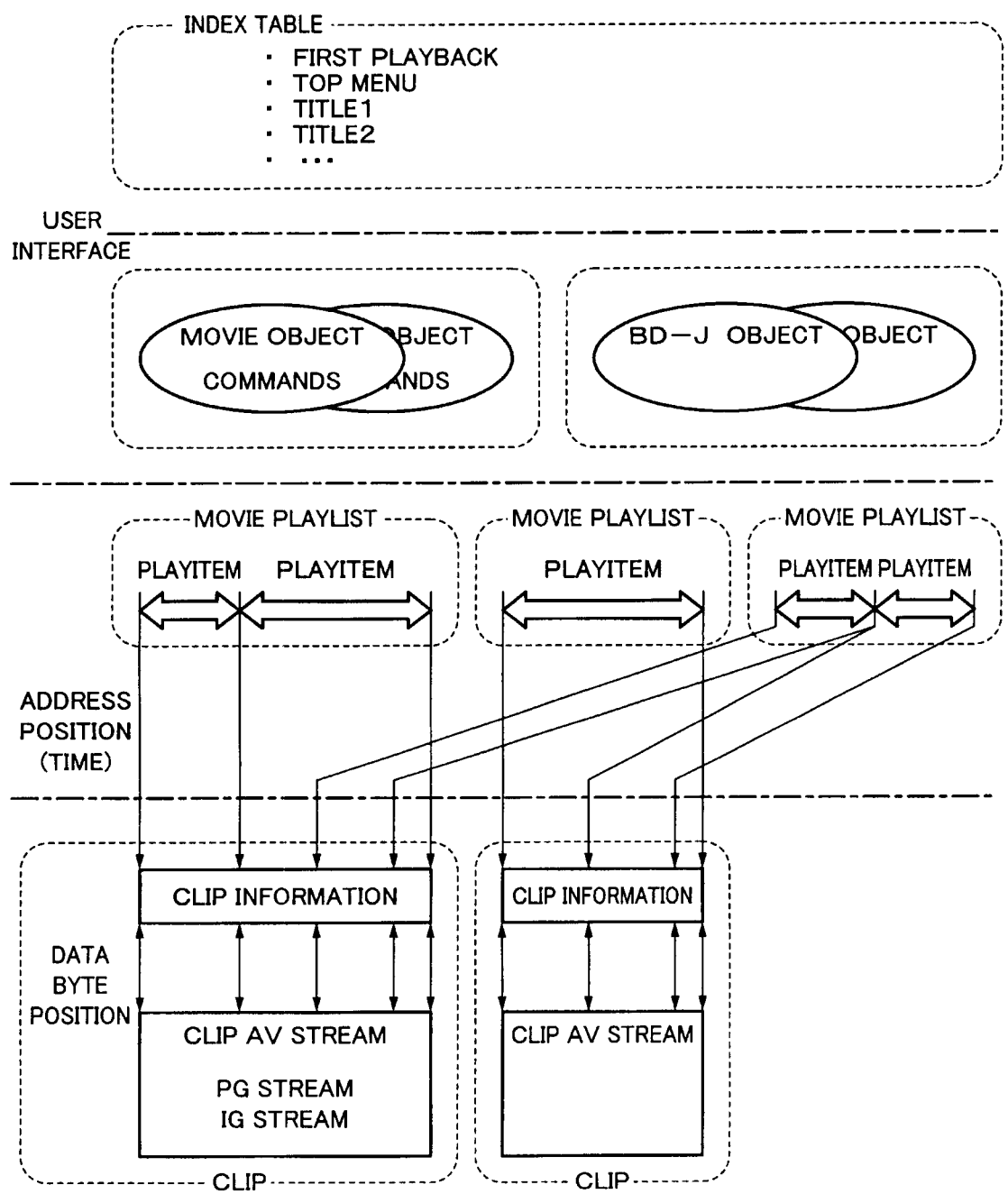
FIG. 2 is a schematic diagram schematically depicting a data model of a BD-ROM.

FIG. 2 schematically depicts a data model of a BD-ROM. A data structure of the BD-ROM is made of 4 layers, as shown in FIG. 2. The lowest layer is provided as a layer in which a clip AV stream is allocated (referred to as clip layer for the sake of convenience). Aright above layer is provided as a layer in which Movie PlayList and PlayItem are allocated, for specifying a reproducing section relevant to the clip AV stream (referred to as PlayList layer for the sake of convenience). The still above layer is provided as a layer in which a MovieObject (MovieObject) or the like is allocated, the MovieObject being composed of a command for specifying a reproducing sequence in response to the Movie PlayList (referred to as object layer for the sake convenience). The top layer is provided as a layer in which an index table is allocated for managing titles or the like stored in the BD-ROM (referred to as index layer for the sake of convenience).

The above clip layer will be described here. The clip AV stream is provided as a bit stream in which video data and audio data are multiplexed in a format such as MPEG2 TS (Transport Stream). Information relevant to this clip AV stream is recorded as clip information in a file.

In addition, multiplexed in the clip AV stream are a presentation graphics (PG) stream that serves as a graphics stream for displaying a subtitle and an interactive graphics (IG) stream obtained by streaming data used for menu display or the like (such as button image data).

A clip AV stream file and a clip information file having the corresponding clip information recorded thereon are regarded as one object, and referred to as clip. Namely, the clip is one object composed of the clip AV stream and clip information.

A file is generally handled as a byte sequence. The contents of the clip AV stream file are expanded along a time axis, and an entry point in the clip is typically specified on a time base. When a time stamp of an access point for a predetermined point has been assigned, the clip information file can be used to find address information on which data readout should be started in the clip AV stream file.

The PlayList layer will be described here. A movie PlayList is composed of a specification of an AV stream file to be reproduced and a set of reproducing start points (IN points) and reproducing end points (OUT points) for specifying a reproducing section of the specified AV stream file. A group of information of a reproducing start point and a reproducing end point is referred to as PlayItem. The movie PlayList is composed of a set of PlayItems. Reproducing a PlayItem means reproducing part of an AV stream file referenced to the PlayItem. In other words, a corresponding section in a clip is reproduced on the basis of information on IN points and OUT points contained in the PlayItem.

The object layer will be described here. A MovieObject includes an HDMV navigation command program and terminal information linked with the MovieObject. The HDMV navigation program is a command for controlling reproducing of a PlayList. Hereinafter, the HDMV navigation command is abbreviated as a navigation command for the sake of convenience. The terminal information includes information for allowing a user's BD-ROM player to operate interactively. The user operation such as a menu screen call and a title search is controlled on the basis of the terminal information.

A BD-J object is made of objects made with a Java® program. Since the BD-J object is not relevant to the present invention so much, a detail is not described here.

The index layer will be described here. The index layer is composed of index tables. The index table is a table of a top level that defines titles of a BD-ROM disc. Based on the title information stored in the index table, reproducing of the BD-ROM disc is controlled by a module manager a system software reside in a BD-ROM.

Figure 3:
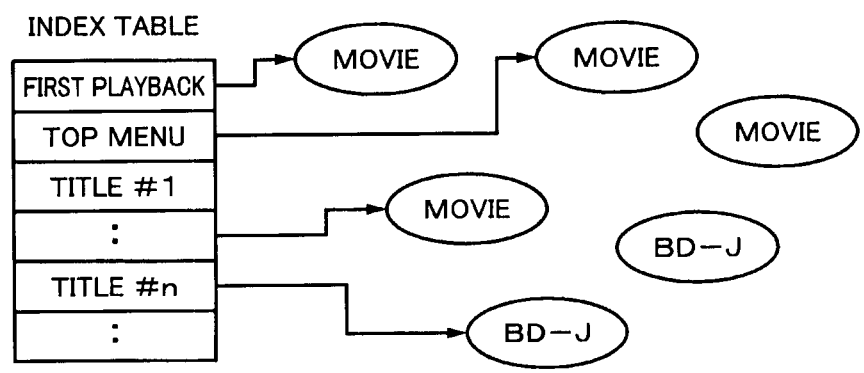
FIG. 3 is a schematic diagram for explaining an index table.

That is, as schematically shown in FIG. 3, an arbitrary entry in the index table is referred to as a title. All of FirstPlayback, TopMenu, and Titles #1, #2, . . . entered in the index table are handled as titles. Each title indicates a link relevant to a MovieObject or a BD-J object. Each title shows either HDMV title or BD-J title.

For example, if the content stored in the BD-ROM is a movie, FirstPlayback is a picture (trailer) for advertisement of a movie production company to be imaged prior to reproducing the main movie. For example if the content is a movie, the TopMenu is a menu screen for selecting reproducing the movie, a chapter search, setting a subtitle or language, or a privileged video reproducing. In addition, a title is provided as each picture selected from the TopMenu. A configuration can be also provided such that a title further serves as a menu screen.

Figure 4:
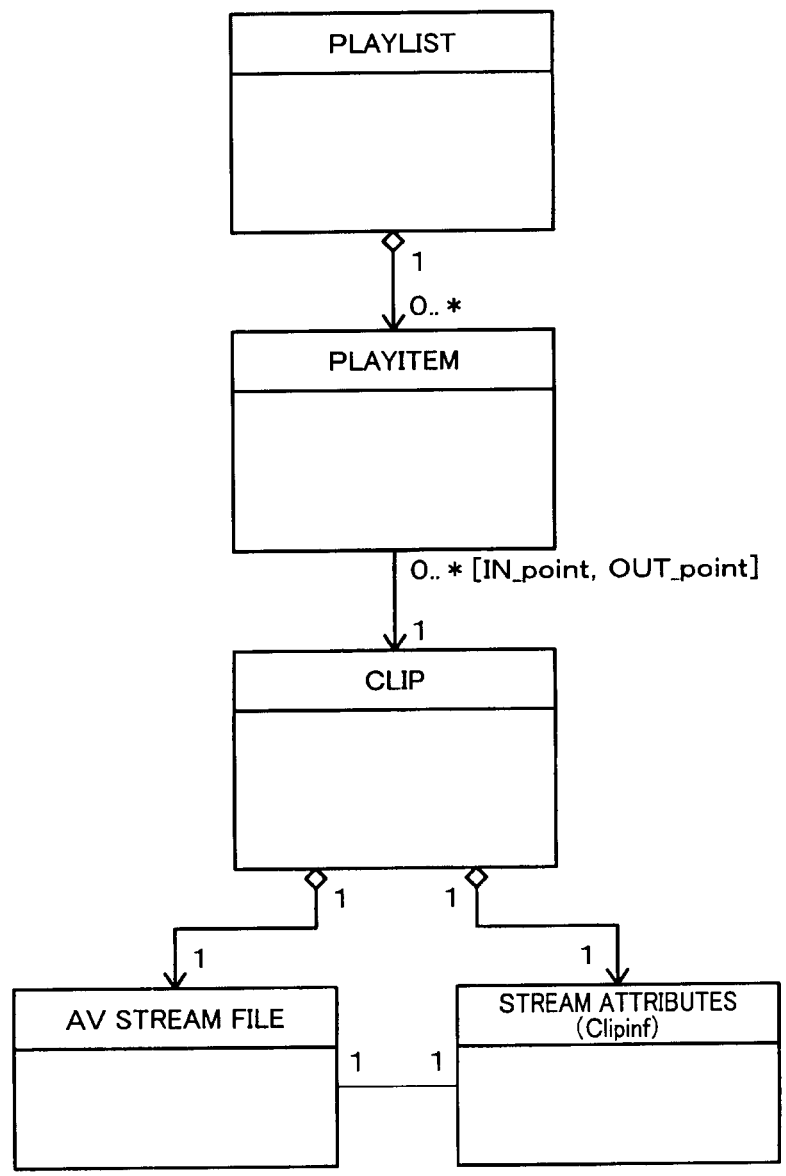
FIG. 4 is a UML diagram showing a relationship among clip AV streams, clip information, clips, PlayItems, and PlayLists.

FIG. 4 is a UML (unified modeling language) chart showing a relationship among the clip AV streams, clip information (Stream Attributes), clips, PlayItems, and PlayLists. The PlayList is associated with one or more of PlayItems, and the PlayItem is associated with one clip. A plurality of PlayItems that are different from each other in start point and/or end point can be associated with one clip. One clip AV stream file is referenced from one clip. Similarly, one clip information file is referenced from one clip. A clip AV stream file and a clip information file have a one to one correlation. Definition of such a structure makes it possible to specify a non-destructive reproducing sequence so as to play back only an arbitrary portion without changing a clip AV stream file.

Figure 5:
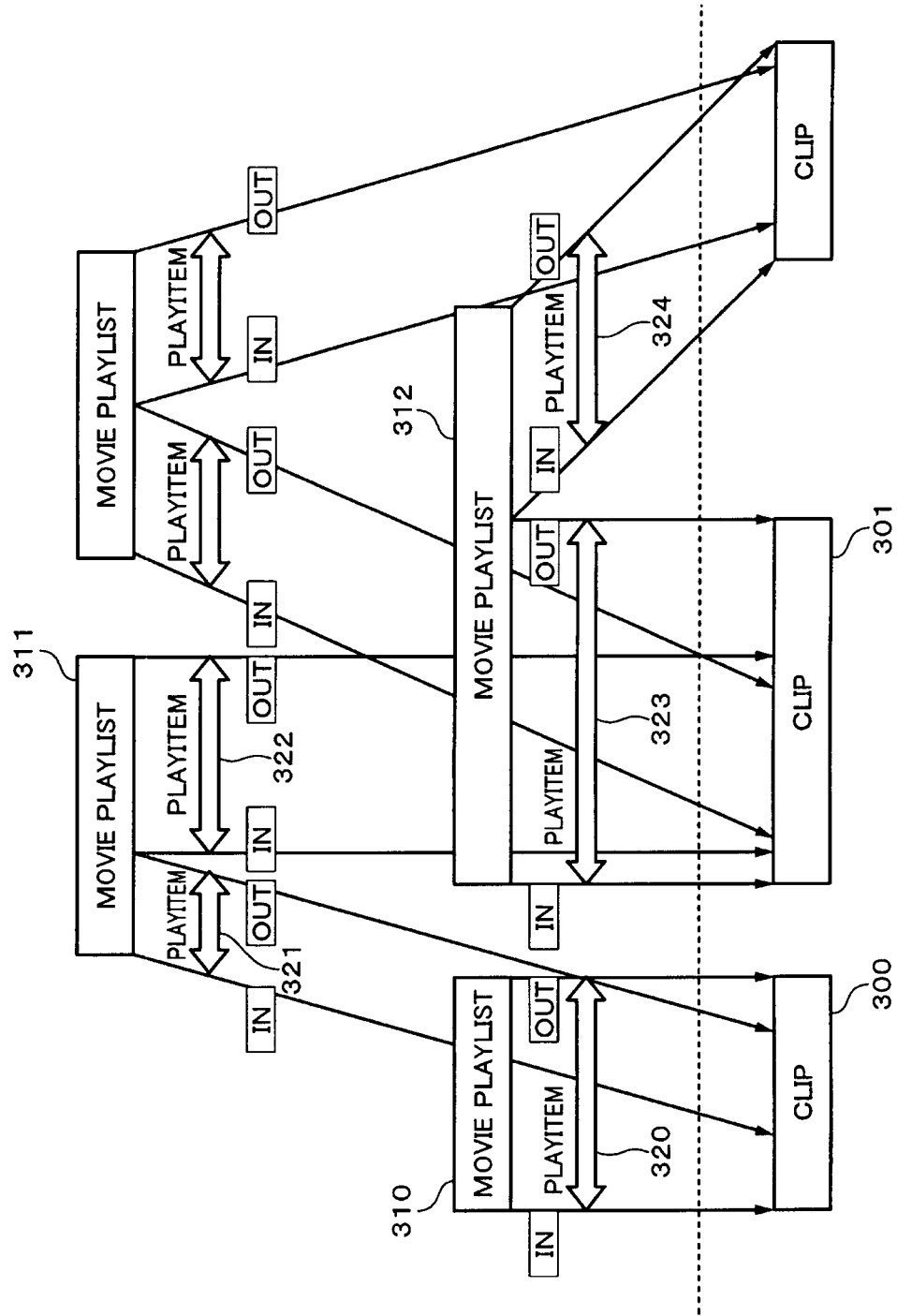
FIG. 5 is a schematic diagram for explaining a method for referencing identical clip from a plurality of PlayLists.

As shown in FIG. 5, identical clips can be referenced from a plurality of PlayLists. In addition, a plurality of clips can be specified from one PlayList. A clip is referenced in accordance with an IN point and an OUT point indicated in a PlayItem in a PlayList. In the example of FIG. 5, a Clip 300 is referenced from PlayItem 320 of PlayList 310 and a section indicated by an IN point and an OUT point is referenced from PlayItem 321 from among PlayItems 321 and 322 that configure PlayList 311. In Clip 301, a section indicated by an IN point and an OUT point is referenced from PlayItem 322 of PlayList 311 and a section indicated by an IN point and an OUT point of PlayItem 323 is referenced among PlayItems 323 and 324 of PlayList 312.

Figure 6:
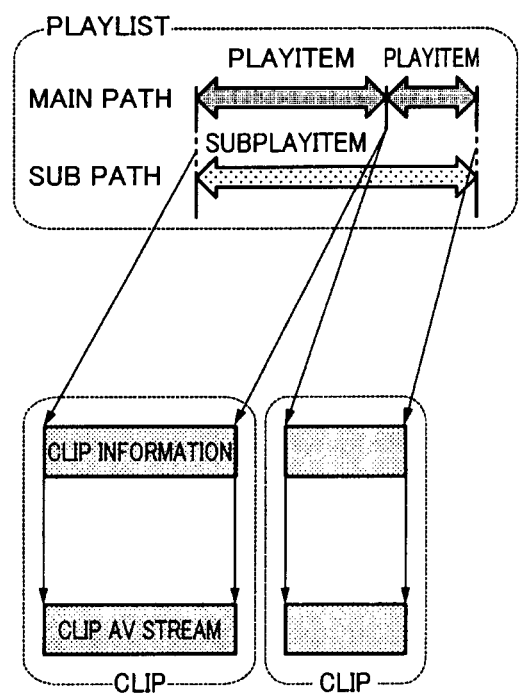
FIG. 6 is a schematic diagram for explaining a sub-path.

A PlayList, as shown as an example in FIG. 6, can have a sub-path that corresponds to a sub-PlayItem associated with a main path that corresponds to a PlayItem to be mainly reproduced. For example, a PlayItem for post-recording associated with this PlayList can be provided as a sub-PlayItem in the PlayList. Although a detail is not described, the PlayList can have a sub-PlayItem only when a predetermined condition is met.

Figure 7:
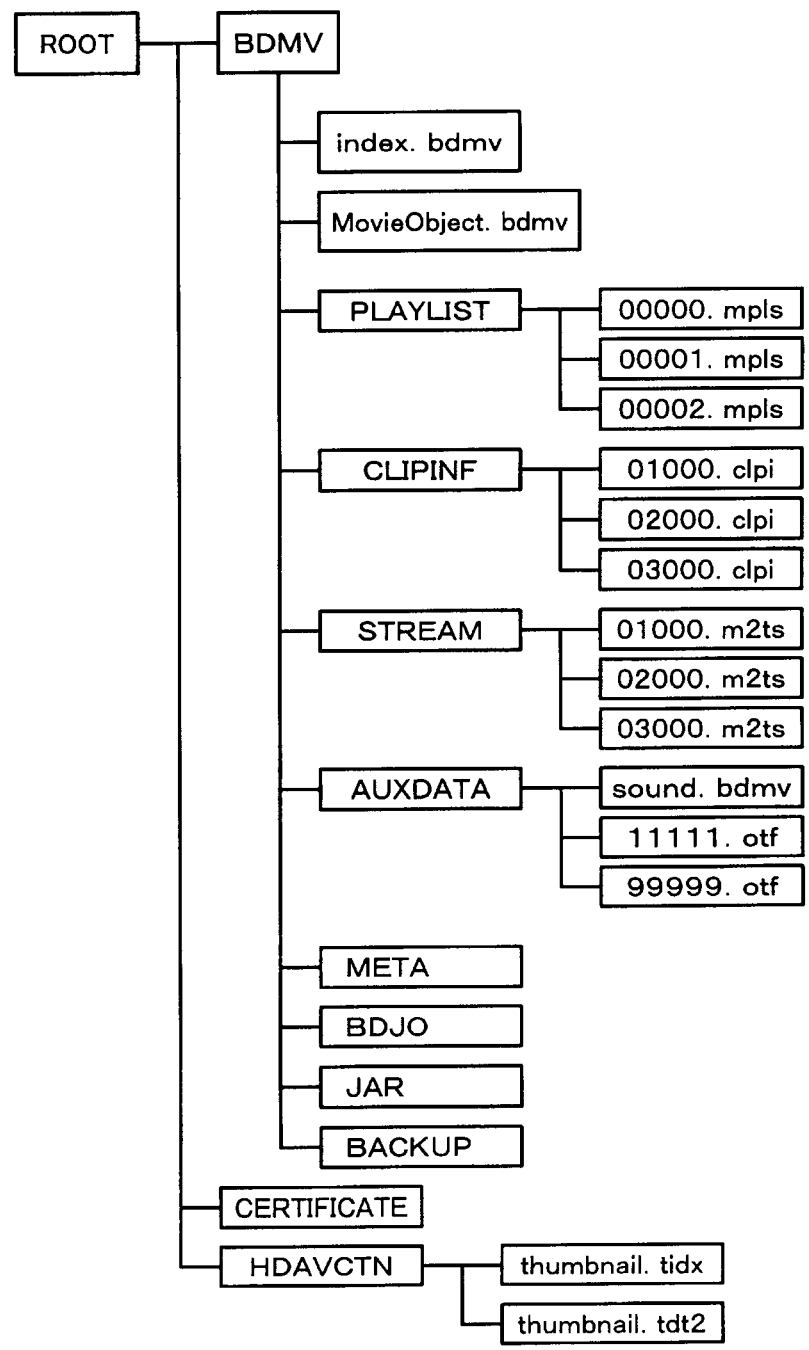
FIG. 7 is a schematic diagram for explaining a structure for managing a file recorded on a recording medium.

Referring now to FIG. 7, a description will be given to a structure of managing a file recorded on a BD-ROM, specified in "Blu-ray Disc Read Only Format part 3". Files are hierarchically managed in accordance with a directory structure. One directory (root directory in the example of FIG. 7) is first created on a recording medium. A hierarchy under this directory is managed by one recording/reproducing system.

A directory "BDMV", a directory "CERTIFICATE", and a directory "HDAVCTN" are placed under the root directory. Information on copyrights is stored in the directory "CEATIFICATE". Thumbnail files such as reduced size of typical images of clips are placed in the directory "HDAVCTN". A data structure described referring to FIG. 2 is stored in the directory "BDMV".

Only two files "index.bdmv" and "MovieObject.bdmv" can be placed immediately under the directory "BDMV". In addition, directory "PLAYLIST", directory "CLIPINF", directory "STREAM", directory "AUXDATA", directory "META", directory "BDJO", directory "JAR", and directory "BACKUP" are placed under the directory "BDMV".

The file "index.bdmv" is described with respect to the contents of the directory BDMV. More specifically, this file "index.bdmv" corresponds to an index table in the index layer that is the top layer as described above. One or more items of MovieObject information are stored in the file "Movieobject.bdmv". Namely, this file "Movieobject.bdmv" corresponds to the object layer described above.

The directory "PLAYLIST" is a directory in which a PlayList database is to be placed. That is, the directory "PLAYL- IST" includes a file "xxxxx.mpls" that is a file concerning a movie PlayList. The file "xxxxx.mpls" is a file that is created for a respective one of the movie PlayLists. In the file name, "xxxxx" immediately preceding "." (period) is for entry of five-digit numbers, and "mpls" immediately succeeding the period is an extent fixedly specified for a file of this type.

The directory "CLIPINF" is provided as a directory in which a clip database is to be placed. That is, the directory "CLIPINF" includes a file "zzzzz.clpi" that is a clip information file relevant to a respective one of clip AV stream files. In the file name, "zzzzz" immediately preceding "." (period) is for entry of five-digit numbers, and "clip" immediately succeeding the period is an extent fixedly specified for a file of this type.

The directory "STREAM" is provided as a directory in which an AV stream file serving as an entity is to be placed. That is, the directory "STREAM" includes a clip AV stream file that corresponds to a respective one of clip information files. Each clip AV stream file is composed of transport streams of MPEG2 (Moving Pictures Experts Group 2) (hereinafter, abbreviated as MPEG2 TS), and a file name is defined as "zzzzz.m2ts". In the file name, "zzzzz" immediately preceding the period is made identical to the corresponding clip information file, thus making it possible to easily grasp a correlation between the clip information file and this clip AV stream file.

The directory "AUXDATA" is provided as a directory in which files such as a sound file, a font file, a font index file, and a bit map file for use in menu display or the like are to be placed. The file "sound.bdmv" stores sound data associated with applications of HDMV interactive graphics streams. A file name is fixedly specified as "sound.bdmv". A file "aaaaa.otf" stores font data for use in functions such as subtitle display and the BD-J applications as described above. In the file name, "aaaaa" immediately preceding the period is for entry of five-digit numbers, and "oft" immediately succeeding the period is an extent fixedly specified for a file of this type. A file "bdmv.fontindex" is a font index file.

A meta data file is stored in the directory "META". Files related to the BD-J object described above are stored in the directory "BDJO" and the directory "JAR". Further, backups of each of the directories and files described above are stored in the directory "BACKUP". Since these directories "META", "BDJO", "JAR", and "BACKUP" do not relate to the gist of the present invention, a detail thereof is not described here.

The directory "HDAVCTN" can place two types of thumbnail files "thumbnail.tidx" and "thumbnail.tdt2". The thumbnail file "thumbnail.tidx" stores information for managing thumbnail images stored in the thumbnail file "thumbnail.tdt2".

Among the files shown in FIG. 7, those deeply relevant to the present invention will be described in more details. First, a file "index.bdmv" placed immediately under the directory "BDMV" will be described. FIG. 8 shows a syntax representing an exemplary structure of the file "index.bdmv". The figure shows a syntax based on a description technique of C-language used as a descriptive language of a program of a computer system or the like. Other figures showing a syntax are described similarly.

In FIG. 8, a field "type_indicator" has a 32-bit data length and indicates that this file is an index table. A field "version_number" has a 32-bit data length and indicates a version of this file "index.bdmv". A field "Indexes_start_address" has a 32-bit data length and indicates a start address of a block "Indexes ( )" that exists in this syntax.

A field "ExtensionData_start_address" has a 32-bit data length and indicates a start address of a block "ExtensionData ( )" that exists in this syntax. The field "ExtensionData_start_address" indicates a start address of a block "ExtensionData ( )" in relative number of bytes from a first byte of this file "index.bdmv". The relative number of bytes is started from "0". If a value of this field "ExtensionData_start_address" is set to "0", it indicates that the block "ExtensionData ( )" does not exists in this file "index.bdmv".

An area, of which a data length is 192 bytes, following the field "ExtensionData_start_address", is a reserved area for the future use. A block "AppInfoBDMV ( )" is provided as a block that a content producer can describe arbitrary information, and does not influence operations such as a player's operation.

The block "Indexes ( )" is substantial contents of this file "index.bdmv", and for example, FirstPlayback to be reproduced when a disc is mounted on a player or a title called from the TopMenu (MovieObject or BD-J object) are specified in accordance with the contents described in this file "index.bdmv". In the following description, a MovieObject and a BD-J object are collectively described as MovieObjects or the like. A movie PlayList file described later is read on the basis of a command described in a MovieObject or the like called from the index table.

FIG. 9 shows a syntax representing an exemplary structure of the block "Indexes ( )". In FIG. 9, a portion that does not directly relate to the present invention is described as an area Reserved. In other words, the expression of FIG. 9 is limitative to a description applied to an extended BDMV format for a recordable recording medium. A field "length" has a 32-bit data length and indicates a data length from immediately succeeding this field "length" to the end of this block "Indexes ( )". Subsequently, a block "FirstPlayback ( )" and a block "TopMenu( )" are allocated.

Information on an object used in FirstPlayback is described in the block "FirstPlayback ( )". A fixed value "01" is described in a first field of the block "FirstPlayback ( )", indicating that the object used in FirstPlayback is a MovieObject. Then, a reproducing type of an HDAVC title is indicated in a field "HDAVC_Title_playback_type" that has a 2-bit data length, and ID of the MovieObject used in FirstPlayback is indicated in a field "FirstPlayback_mobj_id_ref" that has a 16-bit data length.

ID of the MovieObject is indicated by a value "mobj_id" used as a loop variable in a "for" loop statement of the MovieObject on the basis of a syntax of the MovieObject described later with reference to FIGS. 10 and 11, for example. In this example, the value "mobj_id" corresponding to a MovieObject to be referenced is stored in the field "FirstPlayback_mobj_id_ref".

The field "FirstPlayback_mobj_id_ref" in the block "FirstPlayback ( )" of the block "Indexes ( )" may specify a MovieObject of a TopMenu or may specify a title.

Information on an object used in the TopMenu is described in the block "TopMenu ( )". A fixed value "01" is described in a first field of the block "TopMenu ( )", and a fixed value "01" is further described sandwiching an area "Reserved" that has a 30-bit data length with the "01" of the first field. A field "TopMenu_mobj_id_ref" has a 16-bit data length and indicates ID of the MovieObject used in the TopMenu.

A next field "number_of_Titles" of the block "TopMenu ( )" has a 16-bit data length and indicates the number of titles that can be selected and reproduced by a user. In accordance with a following "for" loop statement, a block "Title [title_id] ( )" is described with a value "title_id" is defined as an argument by the number of times indicated in this field "number_of_Titles". Information for each title titles is described in the block "Title [title_id]( )". The value "title_id" is a numeric values ranging from "0" to a value indicated in the field "number_of_Titles" for identifying a title.

In the block "Title [title_id] ( )", a fixed value "01" is described in a first field, and a field "Title_mobj_id_ref" is described sandwiching an area "Reserved" that has a 46-bit data length with the "01" of the first field. The field "Title_mobj_id_ref" has a 16-bit data length and indicates ID of the MovieObject used in this title.

FIG. 10 shows a syntax representing an exemplary structure of a file "MovieObject.bdmv" placed immediately under the directory "BDMV". A field "type_indicator" has a 32-bit (4-byte) data length and indicates that this file is a file "MovieObject.bdmv". In the field "type_indicator", a character string made of four characters encoded in accordance with an encoding scheme specified in ISO (International Organization for Standardization) 646 is described. In the example of FIG. 10, a character string "MOBJ" made of four characters encoded in accordance with an existing scheme in ISO646 is described in the field "type_indicator", indicating that this file is a file "MovieObject.bdmv".

A field "version_number" has a 32-bit (4-byte) data length and indicates a version number of this file "MovieObject.bdmv". In this file "MovieObject.bdmv", the field "version_number" needs to a character string "0100" made of four characters encoded in accordance with the encoding scheme specified in ISO646.

A field "ExtensionData_start_address" has a 32-bit data length and indicates a start address of a block "ExtensionData ( )" that exists in this syntax. The field "ExtensionData_start_address" indicates a start address of a block "ExtensionData ( )" by a relative number of bytes from a first byte of this file "Movieobject.bdmv". The relative number of bytes is started from "0". If a value of this field "ExtensionData_start_address" is set to "0", it indicates that the block "ExtensionData ( )" does not exist in this file "MovieObject.bdmv".

A field "padding_word" in this syntax shown in FIG. 10 has a 16-bit data length, and is included in a "for" loop statement by the number of times indicated by a value N1 or a value N2 in accordance with the syntax of this file "MovieObject.bdmv". The value N1 or the value N2 is 0 or an arbitrary positive integer. In addition, an arbitrary value can be used in the field "padding_word".

An area, of which a data length is 224 bit, following the field "ExtensionData_start_address", is a reserved area for the future use. A block "MovieObject ( )" serving as a main body of this file "Movieobject.bdmv" is stored in an area next to the reserved area.

FIG. 11 shows a syntax representing an exemplary structure of a block "MovieObject ( )". A field "length" has a 32-bit data length and indicates a data length from immediately succeeding this field "length to the end of this block "MovieObject ( )". A field "number_of_mobjs" is allocated sandwiching a reserved area that has a 32-bit data length with the field "length". The field "number_of_mobjs" indicates the number of MovieObjects stored in accordance with immediately succeeding "for" loop statement. A MovieObject is uniquely specified by a value "mobj_id" used as a loop variable of the "for" loop statement. The value "mobj_id" is a value starting from 0, and a MovieObject is defined in accordance with a sequential order described in the "for" loop statement.

In a block "TerminalInfo ( )" that exists in the "for" loop statement, a fixed value "1", a fixed value "0", and a fixed value "0" each are stored in accordance with a field that has a 1-bit data length, and a field "number_of_navigation_commands [mobj_id]" is allocated sandwiching a reserved area of which a data length is 13 bits with the 1-bit field. This field "number_of_navigation_commands [mobj_id]" represents the number of navigation commands ("navigation_command") included in a MovieObject "MovieObject [mobj_id]( )" specified by a value "mobj_id".

In accordance with the "for" loop statement in which a value "command_id" is defined as a loop variable, a navigation command is described by the number indicated in the field "number_of_navigation_commands [mobj_id]". In other words, a field "navigation_command [mobj_id] [command_id] allocated in this "for" loop statement stores a navigation command "navigation_command" of which a sequential order is indicated by a value "command_id", the command being included in a block "MovieObject [mobj_id] ( )" indicated by a value "mobj_id". The value "command_id" is defined by a value starting from 0, and the navigation command "navigation_command" is defined in a sequential order described in this "for" loop statement.

Now, a description will be given here with respect to a block "ExtensionData ( )" defined when the BD-ROM standard is extended to be applicable to a recordable recording medium. The block "ExtensionData ( )" can be described in files such as a file "index.bdmv" in which an index table is to be stored, a file "xxxxx.mpls" in which a PlayList is to be stored, and a clip information file "zzzzz.cpli". In one embodiment of the present invention, the block "ExtensionData ( )" of the file "index.bdmv" is used.

FIG. 12 shows an syntax representing an exemplary structure of the block "ExtensionData ( )". A field "length" has a 32-bit data length and indicates, by the number of bytes, a data length from immediately succeeding this field "length to the end of the block "ExtensionData ( )". If the data length indicated in this field "length" is not set to "0", a description of an "if" statement and subsequent is executed.

A field "data_block_start_address" has a 32-bit data length and indicates a start address of a block "data_block ( )" of which a main body of extension data "ext_data" in this syntax is to be stored, by a relative number of bytes from a first byte of this block "ExtensionData ( )". Namely, the relative number of bytes starts from "0". The field "data_block_start_address" should meet a condition for 32-bit alignment shown below.

data_block_start_address % 4=0

A field "number_of_ext_data_entries" has 8-bit data length and indicates the number of entries of extension data to be stored in a block "data_block ( )" of this block "ExtensionData ( )". Information for retrieving the main body of extension data is stored in entries of extension data. More specifically, the entry of extension data is a block "ext_data_entry ( )" composed of, for example, a field ID1, a field ID2, a field "ext_data_start_address", and a field "ext_data_length". In the block "ExtensionData ( )", the blocks "ext_data_entry ( )" of the number, corresponding to the numbers indicated in this field "number_of_ext_data_entries", exist.

The field ID1 has a 16-bit data length and represents that extension data described in this block "ExtensionData ( )" is extension data for a recording apparatus. A value of this field ID1 is a first value for identifying extension data. This value can be defined that it is assignable by a licenser (authorized person) of a standard that includes this "ExtensionData ( )". The field ID2 is a second value for identifying extension data. This value can be defined as representing a version number of the extension data. In this block "ExtensionData", there should not exist two or more blocks "ext_data_entry ( )" having identical value in the field ID1 or the field ID2 are equal to each other.

A field "ext_data_start_address" has a 32-bit data length and indicates a start address of extension data "ext_data" that corresponds to extension data entries (block "ext_data_entry ( )") in which this field "ext_data_start_address" is included. The field "ext_data_start_address" indicates a start address of extension data "ext_data" by a relative number of bytes from a first byte of the block "ExtensionData ( )". The field "ext_data_start_address" should meet a condition for 32-bit alignment shown below.

ext_data_start_address % 4=0

A field "ext_data_length" has a 32-bit data and indicates a data length of extension data "ext_data" that corresponds to extension data entries (block "ext_data_entries ( )") in which this field "ext_data_start_address" is included. The data length is indicated by the number of bytes.

When the number of extension data entries (block "ext_data_entry ( )") are described by the number indicated in the field "number_of_ext_data_entries", fields "padding_word", each of which has a 16-bit data length and is made of an arbitrary data sequence, are repeated by an arbitrary number of times L1 while two fields are grouped. Then, the block "data_block ( )" is described in which a main body of extension data is to be stored. One or more items of extension data is/are stored in the block "data_block ( )". Each item of extension data "ext_data" is retrieved from the block "data_block ( )" on the basis of the field "ext_data_length" of the field "ext_data_start_address" described above.

Figure 13:
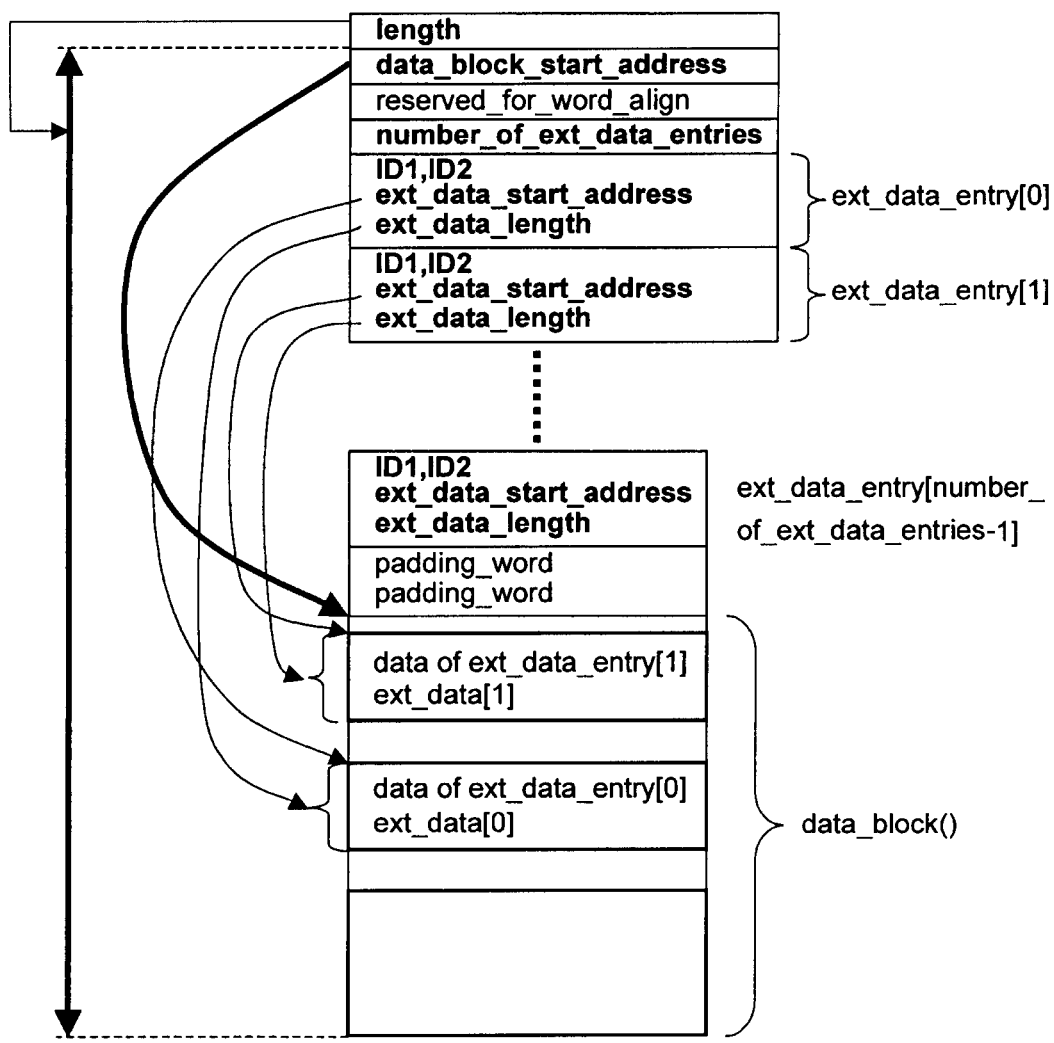
FIG. 13 is a schematic diagram schematically depicting a reference relationship among each of data in a block ExtensionData ( )

FIG. 13 schematically depicts a reference relationship among items of data in a block "ExtensionData ( )". A data length from a position immediately succeeding a field "length" to the end of the block "ExtensionData ( )" is indicated in the field "length". A start position of a block "data_block ( )" is indicated in a field "data_block_start_address". The number of blocks "ext_data_entry" equivalent to the number indicated in a field "number_of_ext_data_entries" are described. A field "padding_word" of an arbitrary length is placed between a last block "ext_data_entry" and the block "data_block ( )".

Extension data "ext_data" indicated with the block "ext_data_entry ( )" is placed in the block "data_block ( )". A position and a data length of each item of extension data "ext_data" are indicated in a field "ext_data_start_address" and a field "ext_data_length" in the corresponding block "ext_data_entry ( )". Therefore, the sequential order of the extension data "ext_data" in the block "data_block ( )" may not coincide with that of the corresponding block "ext_data_entry ( )".

In this manner, a two-layered structure is provided by the block "data_block ( )" in which a main body of extension data is to be stored, and the block "ext_data_entry ( )" in which information on access to the extension data contained in the block "data_block ( )" is to be stored, thereby making it possible to store plural items of extension data.

Figure 14:
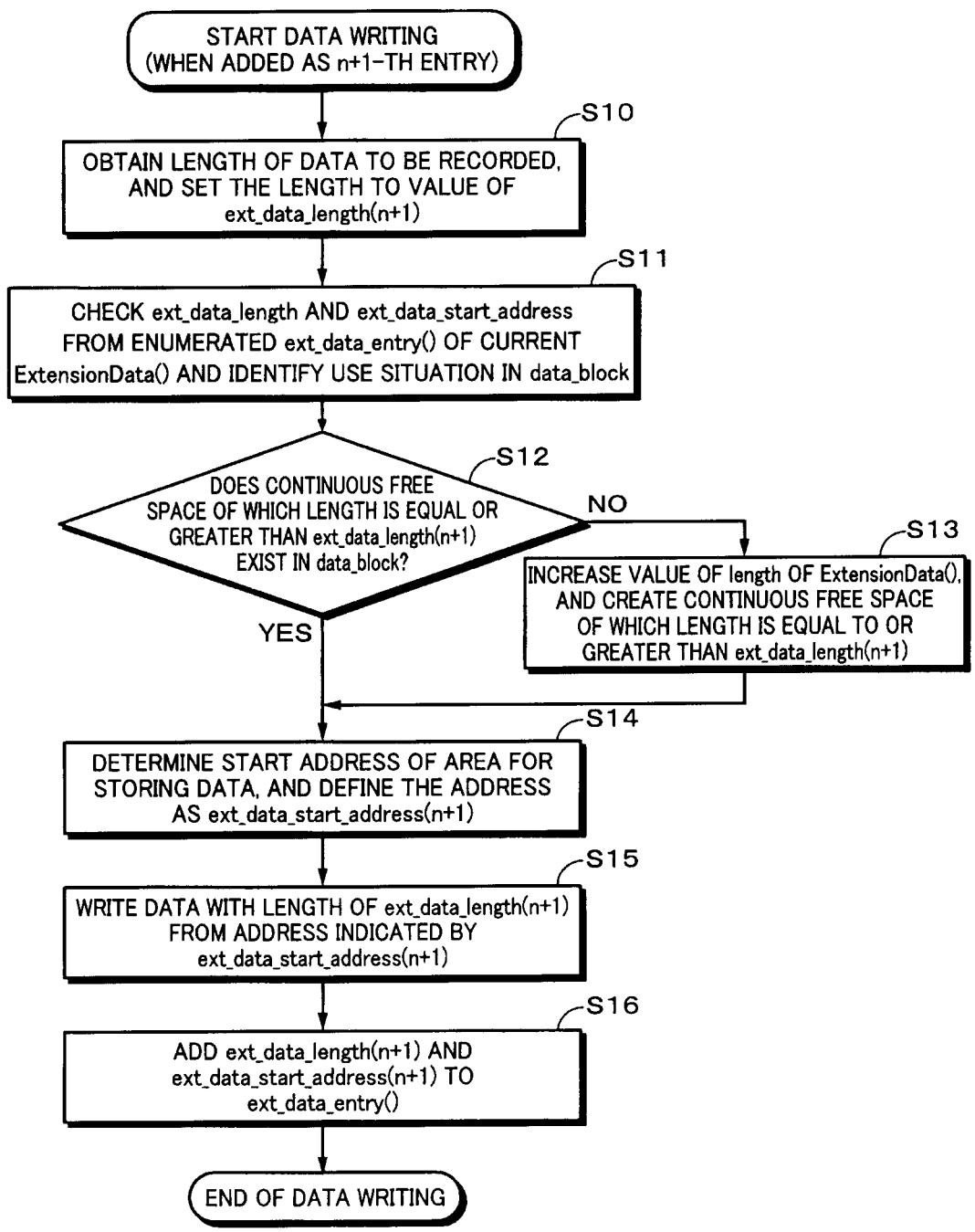
FIG. 14 is a flow chart showing an exemplary process for writing data in a block ExtensionData ( )

Now, a description will be given regarding to methods for creating and reading out extension data according to one embodiment of the present invention. FIG. 14 is a flow chart showing an exemplary process for writing data in a block "ExtensionData ( )". FIG. 14 also shows an example in the case of adding extension data as an (n+1)-th entry in the block "ExtensionData ( )" and rewriting the block "ExtensionData ( )"

First, in step S10, a data length of extension data to be written is obtained, and the obtained data length is set as a value of a field "ext_data_length [n+1]". A description of "[n+1]" corresponds to a number of the (n+1)-th entry. Next, in step S11, values of a field "ext_data_length" and a field "ext_data_start_address" in a block "ext_data_entry ( )" enumerated in a current block "ExtensionData ( )" are checked to retrieve a use situation of the block "data_block ( )".

In the next step S12, it is determined whether or not there exists a continuous free space of which a data length is equal to or greater than that indicated in the field "ext_data_length [n+1]" that is a data length of extension data to be written, in the block "data_block ( )". If the determining result is affirmative, processing is moved to step S14.

On the other hand, if it is determined that there is no continuous free space of which a data length is equal to or greater than that indicated in the field "ext_data_length [n+1]", processing is moved to step S13 in which a value of a field "length" in the block "ExtensionData ( )" is increased, and then, a continuous free space, of a data length, which is equal to or greater than that indicated in the field "ext_data_length [n+1]", is created in the block "data_block ( )". When the free space is created, processing is moved to step S14.

In step S14, a start address of an area, in which extension data to be written, is determined, and a value of the start address is defined as a field "ext_data_start_address [n+1]". In the next step S15, extension data "ext_data [n+1]", having the length set in the field "ext_data_length [n+1]" in the above step S10, is written starting from the address set in the field "ext_data_start_address [n+1]".

When data writing finishes, the field "ext_data_length [n+1]" and the field "ext_data_start_address [n+1]" are added to the block "ext_data_entry ( )" in step S16.

In the foregoing description, it is assumed that the block "ExtensionData ( )" to be rewritten has already been read out from a recording medium such as a disc and stored in a memory of a recording apparatus. Therefore, the extension of the block "ExtensionData ( )" due to a change of the value of the field "length" in step S13 is entrusted to a system, and is performed by the system properly carrying out memory allocation.

Figure 15:
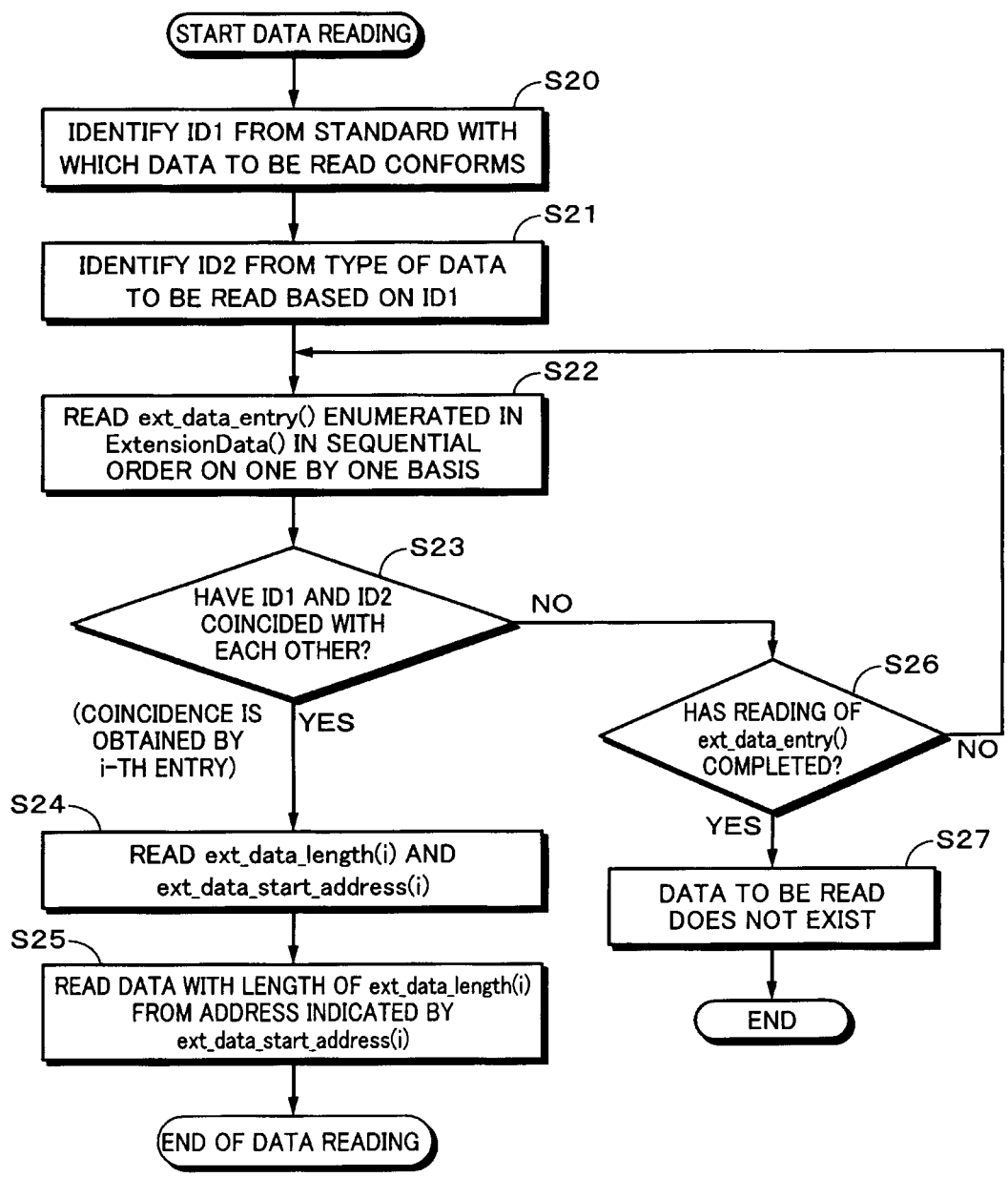
FIG. 15 is a flow chart showing an exemplary process for reading out extension data from a block Extension Data ( )

FIG. 15 is a flow chart showing an exemplary process for reading out extension data from a block "ExtensionData ( )". The process according to the flow chart of FIG. 15 can be applied to both of a read-only recording medium (for example, BD-ROM) and a recordable recording medium (for example, BD-RE).

First, in the first step S20, a value of a field ID1 is retrieved from a standard with which extension data to be read conforms. In step S21, a value of a field ID2 is retrieved from a type of extension data to be read.

In the next step S22, blocks "ext_data_entry ( )" enumerated in the block "ExtensionData ( )" are sequentially read on one by one basis. Then, in step S23, it is determined whether or not values of field ID1 and field ID2 included in the read block "ext_data_entry ( )" coincide with those of the field ID1 and the field ID2 retrieved in the steps S20 and 21 described above.

If the determining result is negative, processing is moved to step S26 in which it is determined whether or not all the blocks "ext_data_entry ( )" enumerated in the block "ExtensionData ( )" have been read. If the determining result is affirmative, processing is moved to step S27 in which it is determined that extension data to be read does not exist in this block "ExtensionData ( )" to finish a series of processes. If the determining result is negative, processing returns to step S22 in which a next block "ext_data_entry ( )" is read.

If in the above step S23, it is determined that the values of the field ID1 and the field ID2 included in the block "ext_data_entry ( )" coincide with the retrieved values of the field ID1 and the field ID2, processing is moved to step S24. In this step, it is determined that the values have coincided with an [i]-th entry in the block "ExtensionData ( )".

In step S24, a value of a field "ext_data_length [i]" and a value of a field "ext_data_start_address [i]" are read from a block "ext_data_entry ( )" of an [i]-th entry. Then, in step S25, data is read out by a data length indicated in the field "ext_data_length [i]" starting from an address indicated in the field "ext_data_start_address [i]" read in step S24.

Now, one embodiment of the present embodiment will be described here. In the embodiment of the present invention, a PlayList is assigned with an attribute indicating a type of the PlayList. Additionally, in the present embodiment, when editing such as title addition or deletion has been carried out, all the data for displaying a menu screen are deleted and newly configure a menu screen on the basis of PlayList information. Further, in the menu configuration, a limitation is provided to a correlation between a title and a PlayList. By doing this, a non-contradictory menu screen can be configured even when a title has been added or deleted.

First, PlayList attributes will be described here. In the present embodiment, PlayLists are roughly classified into three types of PlayLists, i.e., first, second and third types of PlayLists described below based on a purpose of creating them.

The first type of PlayList is created at the same time as when a clip, for example, is created, and the first type of PlayList is recorded on a disc. An attribute "Real" is assigned to this first type of PlayList. Hereinafter, the PlayList having the attribute "Real" assigned thereto is conveniently referred to as Real PlayList. This PlayList is also referred to as original PlayList because it is obtained as a first PlayList indicating a material. By way of example, the Real PlayList specifies the beginning of the created clip as an IN point and the end of the clip as an OUT point, respectively.

The Real PlayList is provided as a PlayList referencing a clip that is a stream entity. When a clip is newly created, a Real PlayList for referencing to the created clip is created. In other words clips, which are not referenced from any Real PlayList, do not exist. Therefore, a total reproducing time of the Real PlayList on the disc seems to coincide with that of the clip recorded on the disc. That is, the remaining time recordable on the disc coincides with a recordable time of the Real PlayList or a title composed of only the Real PlayList from the user's point of view.

The Real PlayList has a one to one correlation with a clip serving as a material. If the Real PlayList is deleted by editing or the like, the corresponding clip is also deleted from the disc. If part of a referenced section of a clip is detected in the Real PlayList, part of the clip corresponding to the Real PlayList is also deleted in accordance with the deleted part. In this way, the editing relevant to the Real PlayList is referred to as an entity editing or a real editing because it causes modification of an entity of the clip recorded on the disc.

The second type of PlayList is provided as a PlayList created using a part or all of existing titles or PlayLists. An attribute "Virtual" is assigned to this second type of PlayList. Hereinafter, the PlayList having the attribute "Virtual" assigned thereto is conveniently referred to as Virtual PlayList. The Virtual PlayList is a PlayList created by setting an IN point and an OUT point for an existing clip and referencing a section defined by the IN point and the OUT point.

By way of example, the Virtual PlayList specifies an IN point and an OUT point for the Real PlayList described above. For example, the Virtual PlayList specifies an IN point and an OUT point for each of a plurality of Real PlayLists and specifies a reproducing sequential order of a plurality of sections specified by the IN point and the OUT point. A Virtual PlayList can be further created on the basis of these Virtual PlayLists. In other words, a Virtual PlayList, for specifying an IN point and an OUT point for one or more Virtual PlayLists, can be created.

The Virtual PlayList can be created at a high speed without changing, for example, a large sized clip (stream entity) at the time of editing. In addition, when the Virtual PlayList is deleted, deletion of only a reference relationship relevant to a clip will suffice, and there is no need for make a change for the clip entity. In this way, the editing of the Virtual PlayList is referred to as imaginary editing or virtual editing because it does not cause modification of the clip entity.

The third type of PlayList is provided as a PlayList for used in reproducing of a menu, and is created at the time of menu creation and updating. An attribute "Menu" is assigned to this third type of PlayList. Hereinafter, the PlayList having the attribute "Menu" assigned thereto is conveniently referred to as Menu PlayList. In other words, the Menu PlayList is provided as a PlayList called from a MovieObject for reproducing a TopMenu.

In this way, in the embodiment of the present invention, types of PlayLists are classified into three types depending on the purpose of creating them. From another point of view, it can be presupposed that types of PlayLists are classified based on the reason why the PlayLists have been created or based on the causes of generation of PlayLists.

In one embodiment of the present invention, an attribute "Menu" is assigned to a PlayList to be used for reproducing of a menu, thereby making it possible to easily identify the PlayList for use in reproducing of a menu and to easily edit a menu. Further, these attributes "Real" and "Virtual" are assigned to a PlayList, thereby making it possible to easily determine, together with deletion of a PlayList, whether or not to delete a clip referenced from the PlayList, for example.

These types of PlayLists are defined as PlayList attribute information in extension data embedded in a file "index.bdmv", and are described in a block "TableOfPlayLists ( ) in a field "ExtensionData( )" of a file "index.bdmv". FIG. 16 shows a syntax representing an exemplary structure of a block "data_block ( )" (refer to FIG. 12) in the field "ExtensionData ( )" in the file "index.bdmv". In the example of FIG. 16, the block "data_block ( )" is described as a block "IndexExtensionData ( )".

First, referring to FIG. 12 described above, a value of a field ID1 is set to "0x1000" and a value of a field ID2 is set to "0x0100" in a block "ExtensionData ( )". The values described in these fields ID1 and ID2 are identified while reference is made to a table stored in advance in a read-only memory (ROM) at the reproducing apparatus side, for example. A block "IndexExtensionData ( )" is stored in areas indicated in a field "ext_data_start_address" and a field "ext_data_length" in the block "data_block ( )". In description of a numeric value, "0x" indicates that the numeric value is expressed in hexadecimal notation.

In the block "IndexExtensionData ( )", a character string is described in a field "type_indicator". The character string is composed of four characters encoded in an encoding scheme specified in accordance with ISO646, and indicates a type of data that follows. In the example of FIG. 16, a character string "IDEX" composed of 4 characters encoded in an existing scheme in accordance with ISO646 is described, which indicates that a data type that follows is "IndexExtensionData ( )".

Following the field "type_indicator", a reserved area having a 32-bit data length is allocated, and then, a field "TableOfPlayLists_start_address" having a 32-bit data length is allocated. The field "TableOfPlayLists_start_address" indicates a start address of a block "TableOfPlayLists ( )" while the start of this block "IndexExtensionData ( )" is defined as a reference.

Following the field "TableOfPlayLists_start_address", a field "MakersPrivateData_start_address" having a 32-bit data length is allocated, a start address of a block "MakersPrivateData ( )" is indicated while the start of this block "IndexExtensionData ( )" is defined as a reference, and then, a block "UIAppInfoHDAVC ( )" is allocated sandwiching a reserved area that has a 192-bit data length with the field "MakersPrivateData_start_address". Then, the block "TableOfPlayLists ( )" described above is allocated sandwiching a padding word "padding_word" that has a 16-bnit data length with the field "UIAppInforHDAVC ( )". Subsequently, the block "MakersPrivateData ( ) is allocated via the padding word "padding_word" that has a 16-bit data length.

Since the blocks "UIAppInfoHDAVC ( )" and "MakersPrivateData( )" are not relevant to the present invention so much, it is not described here.

FIG. 17 shows a syntax representing an exemplary structure of the above-described block "TableOfPlayLists ( )". A field "length" has a 32-bit data length and indicates a data length from immediately succeeding this field "length" to a last byte of the block "TableOfPlayLists ( )", in the number of bytes. A field "number_of_PlayLists" has a 16-bit data length and indicates the number of PlayLists. That is, a total number of PlayLists that exist on a disc is indicated in the field "number_of_PlayLists".

In accordance with a following "for" loop statement, the number of respective fields "PlayList_file_name", "PlayList_attribute" and "title_id_ref" equivalent to the number indicated in the field "number_of_PlayLists", are described. In other words, one loop indicated in this "for" loop statement corresponds to one PlayList and describes a PlayList information including a file name of the PlayList, an attribute assigned to the PlayList, and a reference title ID.

The sequential order based on this "for" loop statement is in order of recording. More specifically, when one PlayList is added, a value of the field "number_of_PlayLists" is incremented by 1, and information on the added PlayList is additionally described in the back of information following to the existing PlayList. In other words, information on a PlayList described based on this "for" loop statement is arranged in a state in which the attributes "Real", "Virtual" and "Menu" coexist.

With determining a sequential order of PlayList information in this way, it is possible to easily know an index of a PlayList recorded or created lastly. In addition, the information is used together with information in the field "PlayList_attribute" to thereby make it possible to know a Real PlayList that is recorded lastly, i.e., a Real PlayList of which the recorded date and time is the latest. The information on the latest Real PlayList is effective when additional recording is made to the existing PlayList.

Fields "reserved_for_future_use" having 6-bit and 16-bit data lengths, respectively, defined in this "for" loop statement are reserved areas for the future use.

A field "PlayList_file_name" is described with a file name of a PlayList being encoded in accordance with an encoding scheme specified in ISO646. A field "PlayList_attribute" relates to one embodiment of the present invention and indicates an attribute assigned to the PlayList.

In a field "title_id_ref", ID (number) of a title to which a PlayList indicated in a field "PlayList_file_name" in the same loop belongs is described. In the case where the PlayList is not reproduced as a title, but is reproduced from only a First-Playback, a value of the filed "title_id_ref" is set to "0xFFFF". In the case where the PlayList is not reproduced as a title, but is reproduced from a TopMenu, on the other hand, a value of the field "title_id_ref" is set to "0xFFFE".

PlayList attributes will be described in more detail. FIG. 18 shows exemplary meanings of attributes of PlayLists. As described above, in one embodiment of the present invention, one of the attributes "Real", "Virtual" and "Menu" is assigned to a PlayList depending on the purpose of creating the PlayList. In the field "PlayList_attribute", a value "1" indicates the attribute "Real", a value "2" indicates the attribute "Virtual", and a value "3" indicates the attribute "Menu", respectively.

In the example of FIG. 18, for each of the attributes, items such as (1) usage, (2) title configuration, (3) IG (interactive graphics), (4) application type (Application_type) of a clip to be referenced by a PlayItem, (5) whether or not coexistence of clips referenced by a PlayItem is allowed in one PlayList, (6) whether or not Sub-Path is allowed, (7) application type of a clip referenced by a sub PlayItem ("SubPlayItem"), and (8) compatibility, are defined. The (8) compatibility relates to a process for editing a PlayList with equipment other than a recording apparatus, which recorded the PlayList recorded.

A description will be given to a case in which a value of a field "PlayList_attribute" is set to "1" and the PlayList is a Real PlayList having an attribute "Real". In this case, as a usage, the PlayList is created together with real recording, and is intended for use in movie image shooting or recording. In the Real PlayList, a still image is also recorded as a movie image. In a title configuration, the Real PlayList is assumed to be configured as a movie title. That is, the Real PlayList is called from a MovieObject. Use of an interactive graphics is disabled in the Real PlayList.

Further, according to the (4) application type of a clip referenced by a PlayItem, the clip referenced by the PlayItem in the Real PlayList is limited to a movie image. Any PlayItem referencing a movie image is not allowed to coexist in the Real PlayList. Use of a sub path is allowed in the Real PlayList. With respect to the (5) whether or not coexistence is allowed in one PlayList with respect to a clip referenced by a PlayItem, an item concerning a sub item is not defined. In addition, according to the (8) compatibility, the Real PlayList is not deleted at the time of editing by another equipment.

A description will be given to a case in which a value of a field "PlayList_attribute" is set to "2" and the PlayList is a Virtual PlayList having an attribute "Virtual". In this case, as a usage, it is assumed that the PlayList is created at the time of non-destructive editing. A Virtual PlayList is assumed to be configured as a movie title. The use of interactive graphics is allowed. In this case, the use of the interactive graphics is allowed in either form of multiplexed in a clip AV stream or not.

According to the (4) application type of a clip referenced by a PlayItem, the clip referenced by the PlayItem in the Virtual PlayList is handled as a movie image or a slide show. In the Virtual PlayList, a PlayItem for referencing a movie image and a PlayItem for referencing a slideshow are allowed to coexist. In the Virtual PlayList, a certain type of sub path can be used, and the clip referenced by a sub PlayItem is handled as a non-multiplexed interactive graphics.

Further, with respect to the compatibility, the Real PlayList is not deleted at the time of editing with another equipment. For example, the Virtual PlayList is added every time editing is carried out by another equipment. There is a possibility that the sub path is not reproduced by another equipment.

A description will be given to a case in which a value of a field "PlayList_attribute" is set to "3" and the PlayList is provided as a Menu PlayList having an attribute "Menu". In this case, as a usage, it is assumed that the PlayList is intended to display a menu. The Menu PlayList can be used in other case than the case in which the list is called from either of a FirstPlayback or a TopMenu. In addition, the Menu PlayList can be configured as a movie title or an interactive title. The use of interactive graphics is allowed in either form of multiplexed in a clip AV stream or not.

According to the (4) application type of a clip referenced by a PlayItem, the clip referenced by the PlayItem in the Menu PlayList is handled as a main path of a movie image, slide show, or a main path of browsable slide show. It is possible to allow a PlayItem for referencing a movie image and a PlayItem for referencing a slide show to coexist in the Menu PlayList. In the Virtual PlayList, predetermined two types of sub paths can be used, and the clip referenced by the sub PlayItem is handled as a non-multiplexed interactive graphics or back-ground music (BGM) for browsable slide show.

With respect to the compatibility, there is a possibility that the Menu PlayList is deleted at the time of editing by another equipment.

These attributes assigned to the PlayList can be changed. More specifically, attributes can be changed by means of an edit operation as long as a state of a result of editing the existing PlayList meets characteristics of their respective attributes. For example, a desired portion of one Real PlayList is referenced from a Virtual PlayList, and a part of the Real PlayList is deleted other than a portion of a clip referenced from the Virtual PlayList is left. Then, attributes of the Virtual PlayList can be changed to the Real PlayList. Such an operation can create a Real PlayList with only the desired portion left.

Now, a description will be given to method for editing and creating an exemplary menu according to one embodiment of the present invention. In the embodiment of the invention, the following restrictions are provided to a BD-ROM standard, thereby making it possible to update a menu when the BD-ROM standard is extended to a recordable recording medium.

A relationship among titles, MovieObjects, and PlayLists is restricted as follows. The term "title" used here denotes a title to be selected to be reproduced in a TopMenu.
(A) A PlayList for a TopMenu and a PlayList for reproducing a general title should be independent of each other.
(B) Each title should be a movie title. That is, each title should not be an interactive title.
(C) Each title should be composed of one PlayList via one MovieObject.

In addition, sequential orders of titles and PlayLists are restricted as follows.
(D) The sequential order of PlayLists in a block "TableOfPlayLists ( )" should be in order of recording.
(E) A PlayList reproduced from each title is determined to be arranged so that arrangement of titles in a block "Indexes ( )" in a file "index.bdmv" corresponds to arrangement in the block "TableOfPlayLists ( )", of the PlayLists excluding the PlayLists that configure a FirstPlayback and a TopMenu.

In one embodiment of the present invention, a menu is configured under restrictions relating to the relationship among titles, MovieObjects and PlayLists in accordance with the items (A), (B) and (C) described above. A more specific description will be given with reference to FIG. 19. In this example of FIG. 19, it is assumed that six titles #1 to #6 are recorded on a disc. As already explained with reference to FIG. 9, each title is registered as a filed "Title [title_id]" identified by a value "title_id" used as a loop variable in a block "Indexes ( )" in a file "index.bdmv", and a MovieObject is referenced by means of a field "Title_mobj_id_ref [title_id]". It is assumed that a title number is defined as a value obtained by adding 1 to a value "title_id". MovieObjects are stored in sequential order of values "title_id" in a file "MovieObject.bdmv", and information on a PlayList to be reproduced is described.

In the PlayList, file names are assigned as, for example, "00001.mpls", "00002.mpls", "00003.mpls", "00004.mpls", "00005.mpls" and "00006.mpls" in sequential order of the created PlayLists, and these file names are stored under a directory "PLAYLIST".

In one embodiment of the present invention, each title calls a respective one of the MovieObjects in accordance with the restriction that "each title should be a movie title", of item (B) described above. In addition, each MovieObject references a respective one of the PlayLists in accordance with the restriction that "each title should be composed of one PlayList via one MovieObject", of item (C) described above. More specifically, titles, MovieObjects, and PlayLists lie in a one to one relationship with each other.

Figure 19:
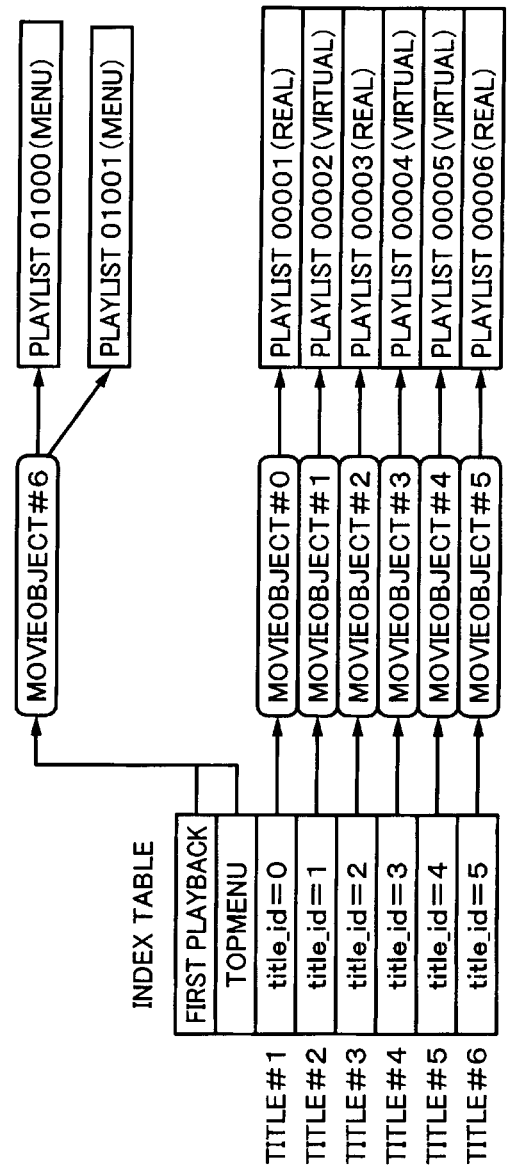
FIG. 19 is a schematic diagram for explaining that a menu is configured under a restriction relevant to a relationship among titles, MovieObjects, and PlayLists.

In the example of FIG. 19, a title with a value "title_id" of 1 and a title number #2 references only a MovieObject #1 to which the value "title_id" corresponds, and the MovieObject #1 references only a PlayList having a file name "00002.mpls". In this example, the PlayList of the file name "00002.mpls" is a Virtual PlayList having an attribute "Virtual" assigned thereto. A title with a title number #3 references only a MovieObject #2 to which the value "title_id" corresponds. In this example, the MovieObject #2 references only a PlayList having a file name "00003.mpls". The PlayList having the file name "00003.mpls" is a Real PlayList having an attribute "Real" assigned thereto, and has a one to one correlation with respect to a clip.

A menu screen for instructing reproducing of a title recorded on a disc is reproduced on the basis of a First Playback and a TopMenu in an index table. A MovieObject referencing to reproducing the menu screen is described in a field "FirstPlayback_mobj_id_ref" of a block "FirstPlayback ( )" in a block "Indexes ( )" in a file "index.bdmv" and in a field, "TopMenu_mobj_id_ref of a block "TopMenu ( )". In this example of FIG. 19, these fields "FirstPlayback_mobj_id_ref" and "TopMenu_mobj_id_ref" both are designed so as to reference an identical MovieObject #6.

Although a detailed description will be given later, a configuration for reproducing a menu screen is created based on a recorded title recorded after title recording. Therefore, a MovieObject referencing to reproducing a menu screen is described next to a lastly referenced MovieObject in a block "MovieObject ( )" of a file "MovieObject.bdmv" together with title recording.

The MovieObject #6 references a Menu PlayList having an attribute "Menu" assigned thereto, for actually reproducing a menu screen. In this example of FIG. 19, the MovieObject #6 references PlayLists having file names "01000.mpls" and "01001.mpls", each of which has an attribute "Menu" assigned thereto.

A definition is made so that a PlayList to reproduce a menu screen is provided with an attribute "Menu", a MovieObject referenced from FirstPlayback and TopMenu only refers to a PlayList provided with an attribute "Menu", and reproducing Menu PlayList the MovieObject referenced from the FirstPlayback and the TopMenu is defined not to reference to each title called from the TopMenu and reference to a MovieObject referenced from the each title. By making these definitions, a restriction can be achieved to an extent such that "a PlayList for a TopMenu and a PlayList for reproducing a general title are independent of each other" of item (A) described above.

Further, a clip referenced from a Menu PlayList and a clip referenced from a PlayList that corresponds to each title called from the TopMenu are independent of each other.

As described above, in one embodiment of the present invention, a FirstPlayback and a TopMenu of an index table, a MovieObject called from the FirstPlayback and the TopMenu, and a PlayList reproduced from the MovieObject are deleted at the time of adding or deleting a title. Then, a FirstPlayback and a TopMenu, a MovieObject called from the FirstPlayback and the TopMenu, and a PlayList reproduced from the MovieObject are newly created on the basis of title information that remains in the index table.

Figure 1:
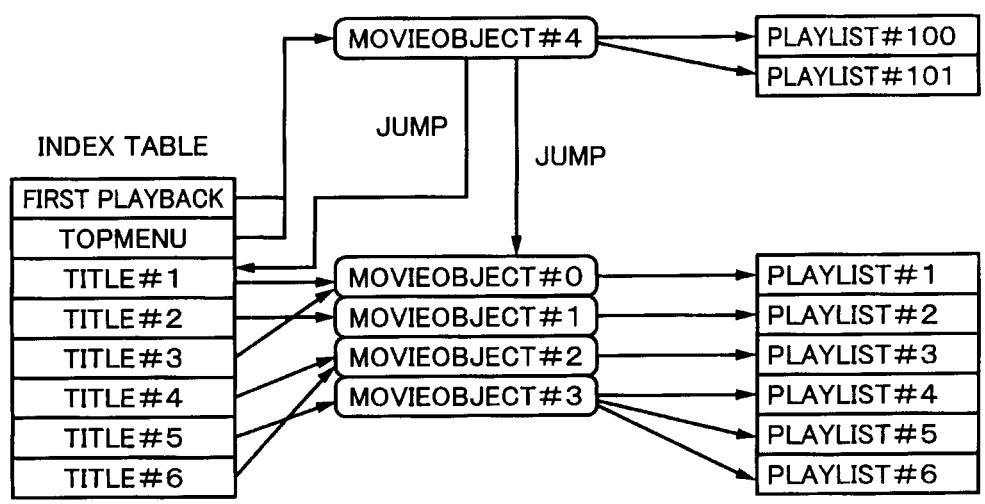
FIG. 1 is a schematic diagram schematically depicting an exemplary relationship among titles, MovieObjects, and PlayLists in accordance with the BD-ROM standard.

As has been described with reference to FIG. 1 in the Related Art section, it is possible for a plurality of different titles to reference an identical PlayList and for a plurality of different MovieObjects to reference an identical PlayList, in the BD-ROM standard for a read-only recording medium. In the BD-ROM standard, it is also possible for a plurality of different PlayLists to reference an identical clip. A reference relationship among titles, MovieObjects, PlayLists and clips is included to be seemingly redundant for a recording apparatus. There is a possibility that maintaining this redundant relationship before and after editing increases a management burden for the recording apparatus.

Therefore, in the embodiment of the present embodiment, a restriction is made so that each title is referenced from a single PlayList. In one embodiment of the invention, it is not allowed that a PlayList referenced from both of a TopMenu and a PlayList referenced from a title. The PlayList referenced from the TopMenu and the PlayList referenced from the title are made independent of each other, thereby the PlayList referenced from the TopMenu may be deleted simply.

Figure 20:
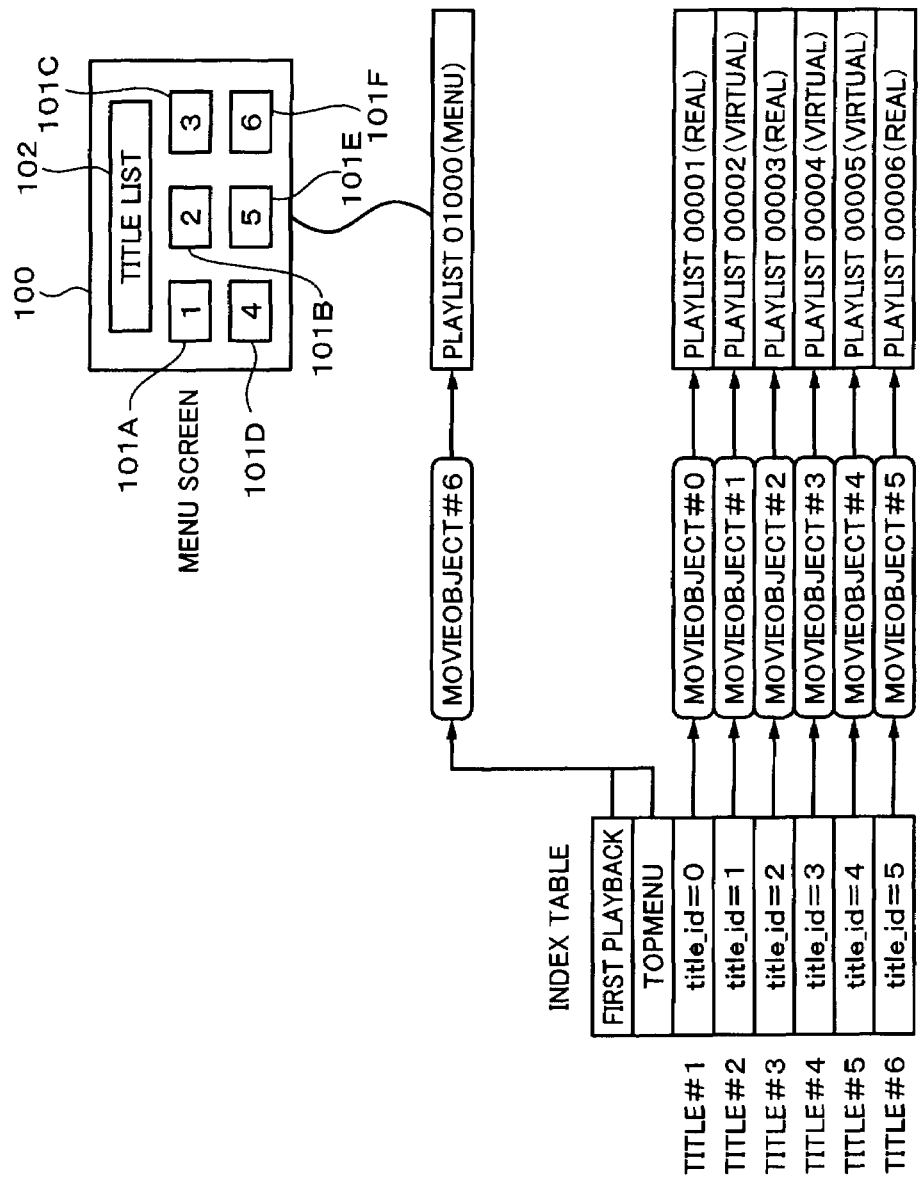
FIG. 20 is a schematic diagram showing an exemplary menu screen immediately before additionally recording a clip and an exemplary configuration of titles, MovieObjects, and PlayLists relevant to the menu screen.

Referring to FIGS. 20 to 25, a process for editing a menu according to one embodiment of the present invention will be more specifically described. Here, a description will be given to a process for additionally recording a clip in a disc in which some clips have already been recorded and a plurality of titles have been formed. FIG. 20 shows an exemplary menu screen 100 immediately preceding additionally recording a clip and an exemplary configuration of titles, MovieObjects, and PlayLists relevant to the menu screen 100. In FIG. 20, the configuration of titles, MovieObjects, and PlayLists is identical to that shown in FIG. 19 described above except that a MovieObject #6 for reproducing the menu screen 100 references a single PlayList, and a detailed detail is not described here.

In FIG. 20, the menu screen 100 is displayed by a PlayList referenced from a FirstPlayback and a TopMenu via the MovieObject #6. In this example of FIG. 20, in response to the menu screen 100, buttons 101A to 101F for instructing reproducing of each of six titles are displayed using predetermined button image data and a title 102 of the menu screen 100 is displayed. For example, the button 101A is specified according to a predetermined method, whereby a title with a value "title_id" of 0 and a title number #1 is specified and a MovieObject #0 is referenced. By a navigation command described in the MovieObject #0, a PlayList having a file name "00001.mpls" is referenced as well as reproducing of the PlayList is instructed, so that a clip corresponding to the PlayList is reproduced.

Figure 21:
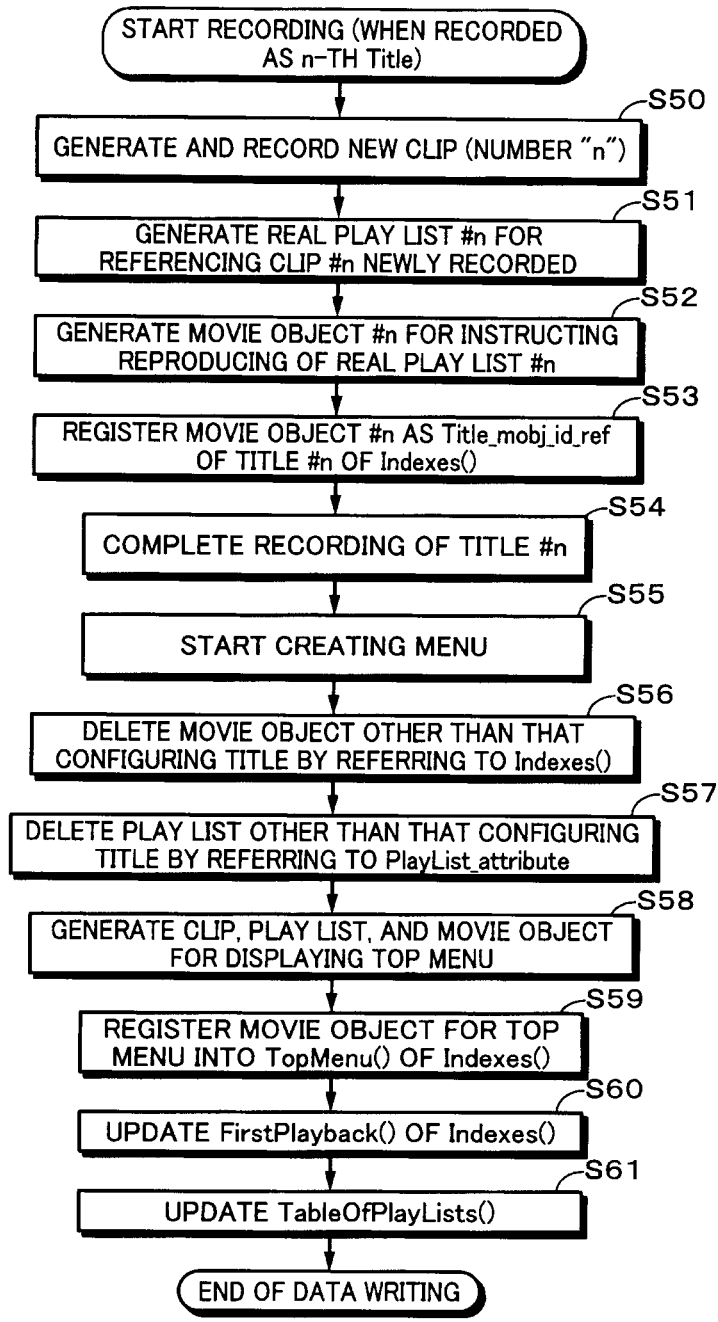
FIG. 21 is a flow chart showing an exemplary process for creating a menu screen when a clip is additionally recorded.

FIG. 21 is a flow chart showing a process for creating an exemplary menu screen when a clip is additionally recorded in response to the state of FIG. 20 described above. Now, a description will be given below starting from recording of a new clip based on the flow chart. In the description of the flow chart, it is assumed that a new clip is recorded as an n-th title in a disc. For example, movie shooting is started by a video camera to which the embodiment of the present invention can be applied, and concurrently, a new clip (for example, clip #n) based on the shot movie is created. The created clip #n is recorded on a disc (step S50).

When the clip is recorded on the recording medium, a PlayList #n for referencing the clip #n is created, and an attribute of the PlayList is defined as "Real" in the next step S51. With respect to a PlayList, it is possible to discriminate whether the PlayList is used for a TopMenu or is used for a title depending on the attribute. A file name of the created PlayList file is determined so as not to overlap a file name of a PlayList other than a PlayList of which an attribute is defined as "Menu", from among the PlayList files that already exist on a disc, and the file name is defined as "00007.mpls", for example.

A block "TableOfPlayLists ( )" in an extension data block "ExtensionData ( )" in an index file "index.bdmv" is updated together with creation of the PlayList "#n". That is, in the block "TableOfPlayLists ( )", a value of a field "number_of_PlayLists" is increased by the number of created PlayLists, and items of information on fields "PlayList_file_name", "PlayList_attribute", and "title_id_ref" are described respectively for each of the created PlayLists. Then, a value of a field "length" is updated based on the added contents.

More specifically, a value of the field "number_of_PlayLists" is increased by 1. With respect to the created PlayList having a file name "00007.mpls", the filename is described in a field "PlayList_file_name". In addition, an attribute of the PlayList is defined as "Real", and a value indicating the attribute "Real" is described in a field, "PlayList_attribute". In a field "title_id_ref", the value "title_id" of a title that belongs to a PlayList at the time of creation of the PlayList is described in the case where the attribute of the PlayList is "Real" or "Virtual".

Further, in the next step S52, a MovieObject #n for instructing reproducing of the PlayList #n is created. This MovieObject #n is registered, in a block "Indexes ( )" in an index file "index.bdmv", as a field "Title_mobj_id_ref [n]" of which a value is set to "n", and is defined as an n-th title #n (step S53). Recording the title #n on a disc is completed by means of processing up to the step S53.

Figure 22:
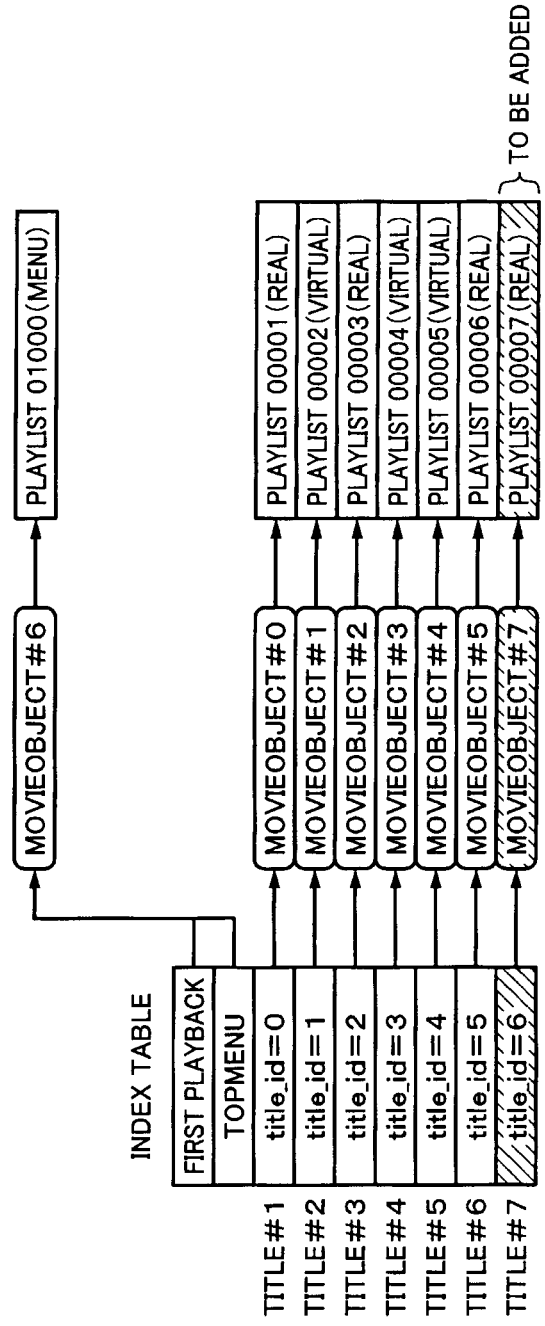
FIG. 22 is a schematic diagram for explaining an exemplary process for creating a menu screen when a clip is additionally recorded.

FIG. 22 shows an exemplary configuration in which a title "#n" has been added by means of processing up to the step S53 in response to the configuration shown in FIG. 20. In FIG. 22, added portions are indicated by way of shadings. Since in this example of FIG. 22, a title #n is added to six titles that have already been recorded, a value "title_id" is set to 6 and a title number is set to #7. A MovieObject referenced by the added title #7 is created as a MovieObject #7 next to the existing MovieObject #6. A PlayList to be added having the file name "00007.mpls" is first created for the clip together with clip recording, so that an attribute is defined as "Real".

The step S55 and subsequent steps are directed to a process for creating the menu screen 100 according to title addition. In step S56, the block "Indexes ( )" in the index file "index.bdmv" is referenced, and MovieObjects other than that configuring a title are deleted. Namely, MovieObjects referenced from a FirstPlayback and a TopMenu are deleted. Referring to the example of FIG. 9, a MovieObject referenced by a field "FirstPlayback_mobj_id_ref" in a block "FirstPlayback ( )" and a MovieObject referenced by a field "TopMenu_mobj_id_ref" in a block "TopMenu ( )" are deleted from a file "MovieObject.bdmv" in the block "Indexes ( )".

Next, in the step S57, an attribute of a PlayList is referenced, and PlayLists other than that configuring a title are deleted. That is, referring to FIGS. 8, 16 and 17, a block "TableOfPlayLists ( )" (FIG. 16) is referenced based on a field "TableOfPlayLists_start_address" from extension data (block "ExtensionData ( )": FIG. 8) in an index file "index.bdmv", so that a field "PlayList_attribute" for each PlayList is referenced in a block "TableOfPlayLists ( )". Based on information on the field "PlayList_attribute", a PlayList file name having other attribute than "Real" and "Virtual", i.e., having an attribute "Menu" is searched. A PlayList stored in a directory "PLAYLIST" is deleted corresponding to a file name of the searched PlayList.

Figure 23:
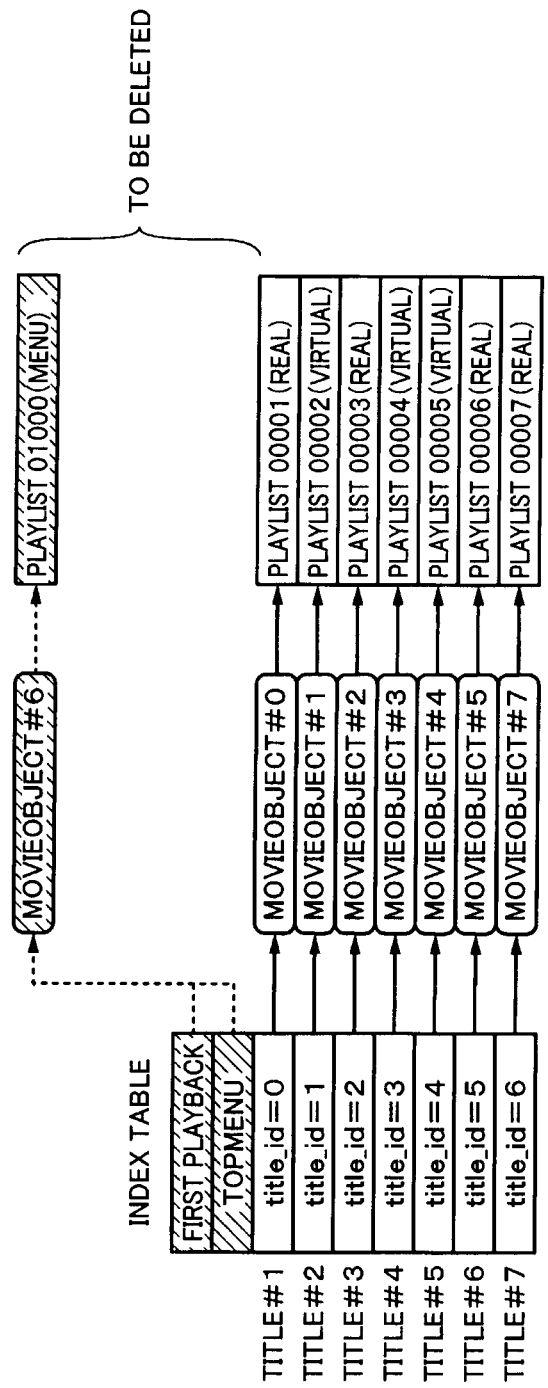
FIG. 23 is a schematic diagram for explaining an exemplary process for creating a menu screen when a clip is additionally recorded.

FIG. 23 schematically depicts how a MovieObject and a PlayList are deleted in accordance with the processes of the steps S56 and S57. In FIG. 23, a portion to be deleted is indicated by way of shadings. In an index table, a MovieObject #6 referenced from a FirstPlayback and a TopMenu is deleted (step S56). The MovieObject #6 references a PlayList having an attribute "Menu" assigned thereto. By the step S57, a PlayList file name with the attribute "Menu" is searched, and deleted, so that a PlayList referenced from the MovieObject #6 is deleted.

Figure 24:
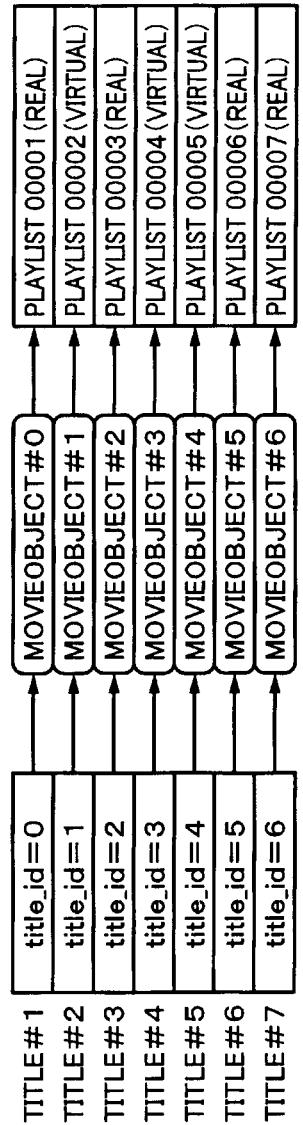
FIG. 24 is a schematic diagram for explaining an exemplary process for creating a menu screen when a clip is additionally recorded.

FIG. 24 schematically depicts how a PlayList for reproducing a menu screen to define a MovieObject for referencing the PlayList have been deleted. In a MovieObject #7 immediately before deletion processing, a value "title_id" is changed after deletion of the MovieObject, and a MovieObject #6 is defined. The entity of the MovieObject #6 after the deletion is identical to the MovieObject #7 before deletion, and only the number has been changed.

As described above, MovieObjects are described in sequential order of values "title_id" that serve as loop variables in a "for" loop sentence in a block "MovieObject ( )" in a MovieObject file "MovieObject.bdmv". For this reason, a value "title_id" corresponding to a MovieObject should not be missing. Therefore, when a MovieObject #7 is newly added and a MovieObject #6 for reproducing a menu screen is deleted, the added MovieObject #7 is referenced with a value in "title_id" with which the deleted MovieObject #6 is referenced immediately before deletion.

In an index table as well, a First Playback and a TopMenu are deleted.

A clip, a MovieObject, and a PlayList for displaying a TopMenu are created in the next step S58. This process is carried out as follows, for example. First, a clip for displaying a menu screen is created. As the clip, for example, image data automatically created in accordance with a predetermined program may be used. Without being limited thereto, image data for a menu screen may be prepared in advance on a disc or in a recording apparatus and used as the clip. In addition, image data used for a menu screen may be either of movie image data or still image data. Further, button image data used to instruct title reproducing can be created similarly. A thumbnail image corresponding to a clip used for a title can be further used. The thus created data is, for example, multiplexed in a predetermined manner, and the multiplexed data is recorded as a clip AV stream file on a disc.

Next, a clip information file corresponding to the clip AV stream file is created, and further, a PlayList for referencing the clip information file is created. A file name of a PlayList is determined so as not to overlap, for example, a file name of the existing PlayList and a file name of the PlayList that has existed insofar. In this example, a file name of the PlayList is defined as "101002.mpls".

When a PlayList is created, a MovieObject for referencing the PlayList is created. The MovieObject is defined as the process for deleting a MovieObject in accordance with the step S56 and as a MovieObject next to a MovieObject of which a number has been changed together with the deleting process.

In the next step S59, the MovieObject for reproducing a TopMenu, created in the above step S58, is registered in a block "TopMenu ( )" in a block "Indexes ( )" in an index file "index.bdmv". That is, referring to FIG. 9, data indicating the MovieObject is described in a field "TopMenu_mobj_id_ref" in the block "TopMenu ( )".

In the next step S60, a block "FirstPlayback ( )" in the block "Indexes ( )" in the index file "index.bdmv" is updated. Specifically, in the block "FirstPlayback ( )", a value of a field "HDAVC_Title_playback_type" is set to a predetermined value, and data indicating the MovieObject for reproducing a TopMenu, created in the above step S58, is described in a field "FirstPlayback_mobj_id_ref".

Then, in the next step S61, a block "TableOfPlayLists ( )" in an extension data block "ExtensionData ( )" in the index file "index.bdmv" is updated. That is, in this step S61, information on the PlayList for reproducing a TopMenu, created in the above step S58, is described in the block "TableOfPlayLists ( )".

More specifically, in the block "TableOfPlayLists ( )", a value of a field "number_of_PlayLists" is incremented by 1, the PlayList configuring a TopMenu, a field "PlayList_file_name" is described with a file name of a newly created PlayList, and an attribute of the PlayList is defined as "Menu" and a value indicating the attribute "Menu" is described in a field "PlayList_attribute". In the case where an attribute of a PlayList is defined as "Menu" and the PlayList is referenced from a TopMenu, a value of a field "title_id_ref" is fixedly set to "0xFFFE". Then, a value of a field "length" is updated based on the added contents.

Figure 25:
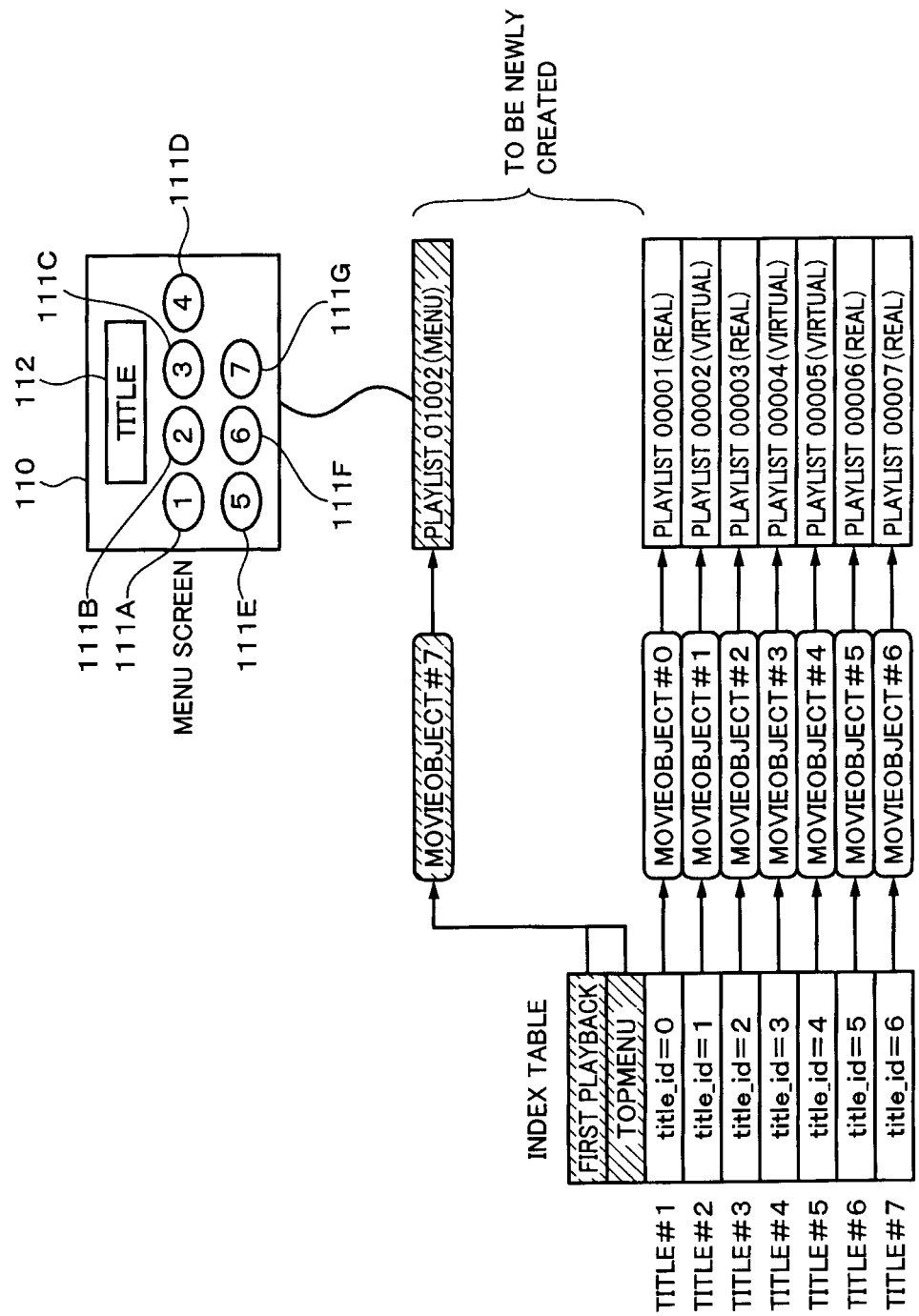
FIG. 25 is a schematic diagram for explaining an exemplary process for creating a menu screen when a clip is additionally recorded.

FIG. 25 shows an exemplary configuration of index tables, MovieObjects, PlayLists, and a menu screen 110 after processing of the step S61. Through the processing of the steps S58 to S61, a configuration for reproducing a TopMenu is added to the state of FIG. 24 described above. In other words, a FirstPlayback and a TopMenu are added in an index table. A MovieObject #7 referenced from these FirstPlayback and TopMenu is added, and further, a PlayList having an attribute "Menu" assigned thereto, the PlayList being referenced from the MovieObject #7, is added. In FIG. 25, the added portions are shown by way of shading.

The menu screen 110 is newly created in response to the menu screen 100 illustrated in FIG. 20 before title addition. For example, one button for instructing title reproducing is added together with addition of one title. In this example of FIG. 25, button images for displaying buttons are newly created, and buttons for instructing title reproducing are used after created as new buttons 111A to 111G based on the new button images. In addition, a title 112 of the menu screen 110 is also newly created. Of course, button images or titles used for the menu screen 100 before title addition can be configured for reuse without being limited thereto.

A process for updating files "index.bdmv" and "MovieObject.bdmv" in the flow chart of FIG. 21 described above is actually handled as a process on a work memory of a central processing unit (CPU). For example, when a disc is mounted, a recording apparatus first reads out an index file "index.bdmv" or a MovieObject file "MovieObject.bdmv" from the disc, and stores the files in a work memory of a CPU. Upon the receipt of a command for editing a menu, the CPU carries out the processing described above for these files stored on the work memory. These updated files are written back to a disc at such a predetermined timing as at the time of disc ejection or at the time of turning off the power of the recording apparatus.

Now, a description will be given to a recording/reproducing apparatus to which one embodiment of the present invention can be applied. First, a virtual player will be briefly described here. When a disc having the data structure as described above is mounted on the player, the player should convert a command described in a MovieObject or the like read out from the disc into a specific command for controlling hardware inside of the player. The player stores software for carrying out such conversion in advance in a ROM (Read Only Memory) incorporated therein. This software is referred to as a BD virtual player because it causes the player to operate in conformity with the BD-ROM standard via the disc and the player.

Figures 26A, 26B:
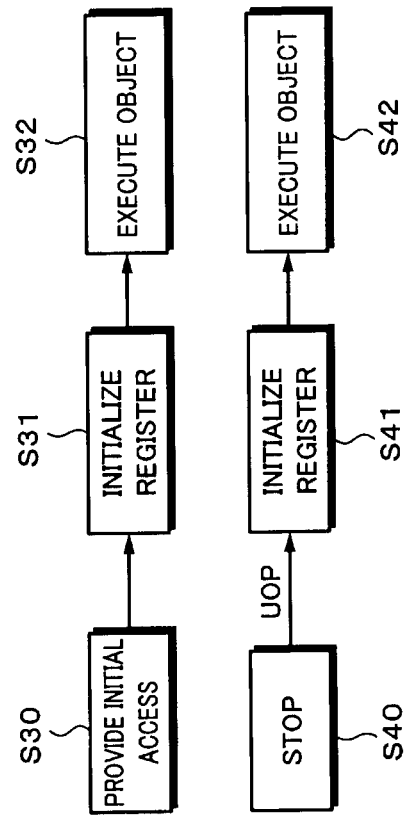
FIGS. 26A and 26B are flow charts schematically depicting an operation of a BD virtual player.

FIGS. 26A and 26B schematically depict an operation of the BD virtual player. FIG. 26A shows an example of operation at the time of disc loading. When the disc is mounted on the player to provide initial access to the disc (step S30), a register, in which shared parameters commonly used in disc 1 are stored, is initialized (step S31). Then, in the next step S32, a program described in a MovieObject or the like is read from the disc, and the read program is executed. The initial access used here denotes that the disc is first reproduced, for example, at the time of disc loading.

FIG. 26B shows an example of operation, for example, in the case where a user depresses a play key to instruct reproducing while the player is inactive. In response to a first inactive state (step S40), the user instructs reproducing by using, for example, a remote control commander (UO: User Operation). When reproducing is instructed, registers, i.e., common parameters are first initialized (step S41). In the next step S42, a process moves to a MovieObject execution phase.

Figure 27:
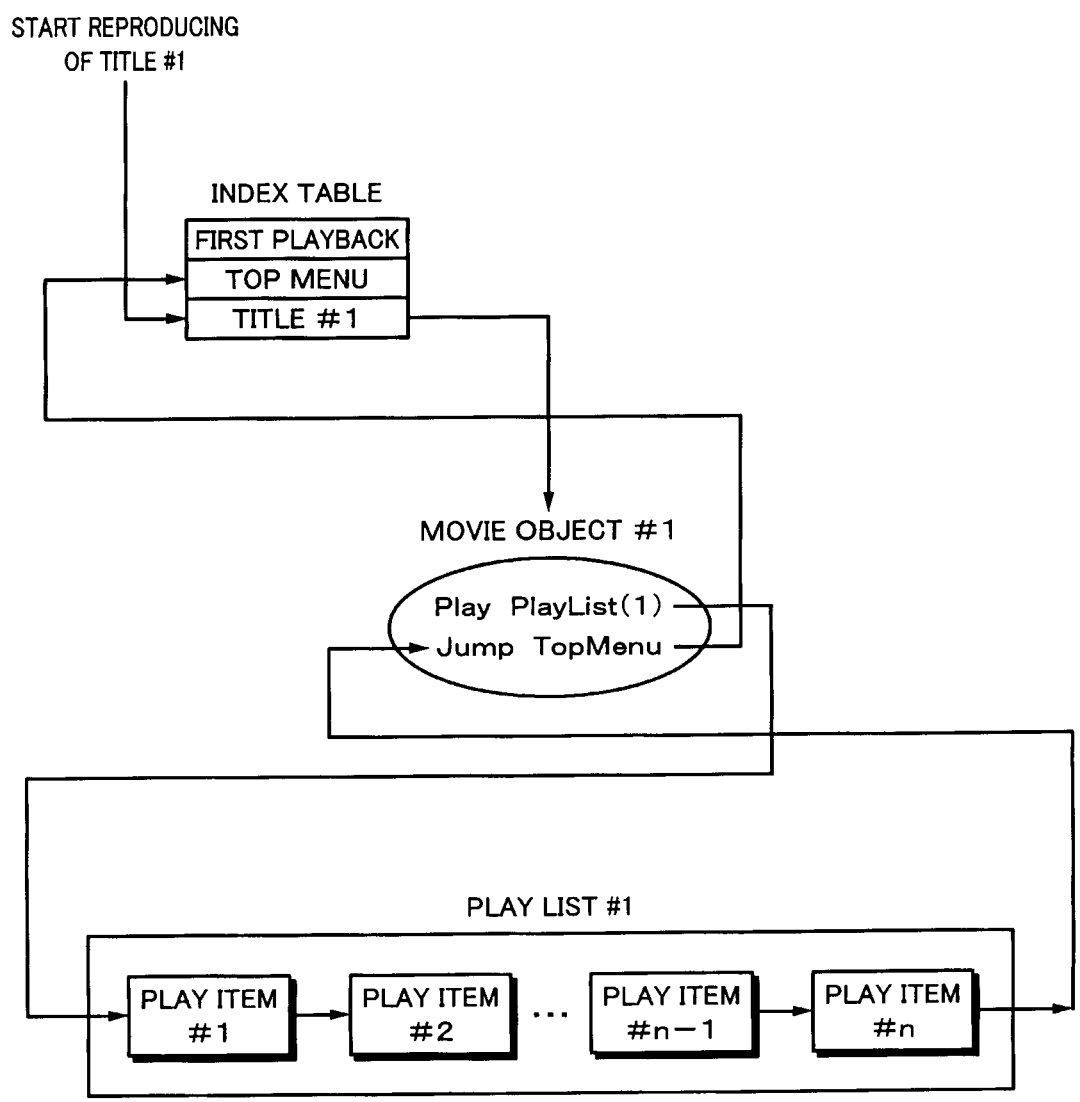
FIG. 27 is a schematic diagram schematically depicting an operation of a BD virtual player.

Referring now to FIG. 27, a description will be given to reproducing of a PlayList in a MovieObject execution phase. Let us consider a case in which an instruction for starting reproducing of contents of a title number #1 is supplied by means of UO or the like. The player references an index table shown in FIG. 3 described above to retrieves a number of an object that corresponds to reproducing of contents of a title #1 in response to an instruction for starting reproducing of contents. For example, assuming that a number of an object for achieving reproducing of contents of the title #1 is #1, the player starts execution of a MovieObject #1.

In this example of FIG. 27, assuming that a program described in the MovieObject #1 is composed of 2 lines and a command of the first line is "Play PlayList (1)", the player starts reproducing of a PlayList #1. The PlayList #1 is composed of one or more PlayItems, and the PlayItems are sequentially reproduced. When reproducing of the PlayItems in the PlayList #1 finishes, processing returns to execution of the MovieObject #1, and then, a command of the second line is executed. In the example of FIG. 27, a command of the second line is defined as "jump TopMenu" and the line is executed, thereby the process of the MovieObject for realizing TopMenu, described in an index table, is started.

Figure 28:
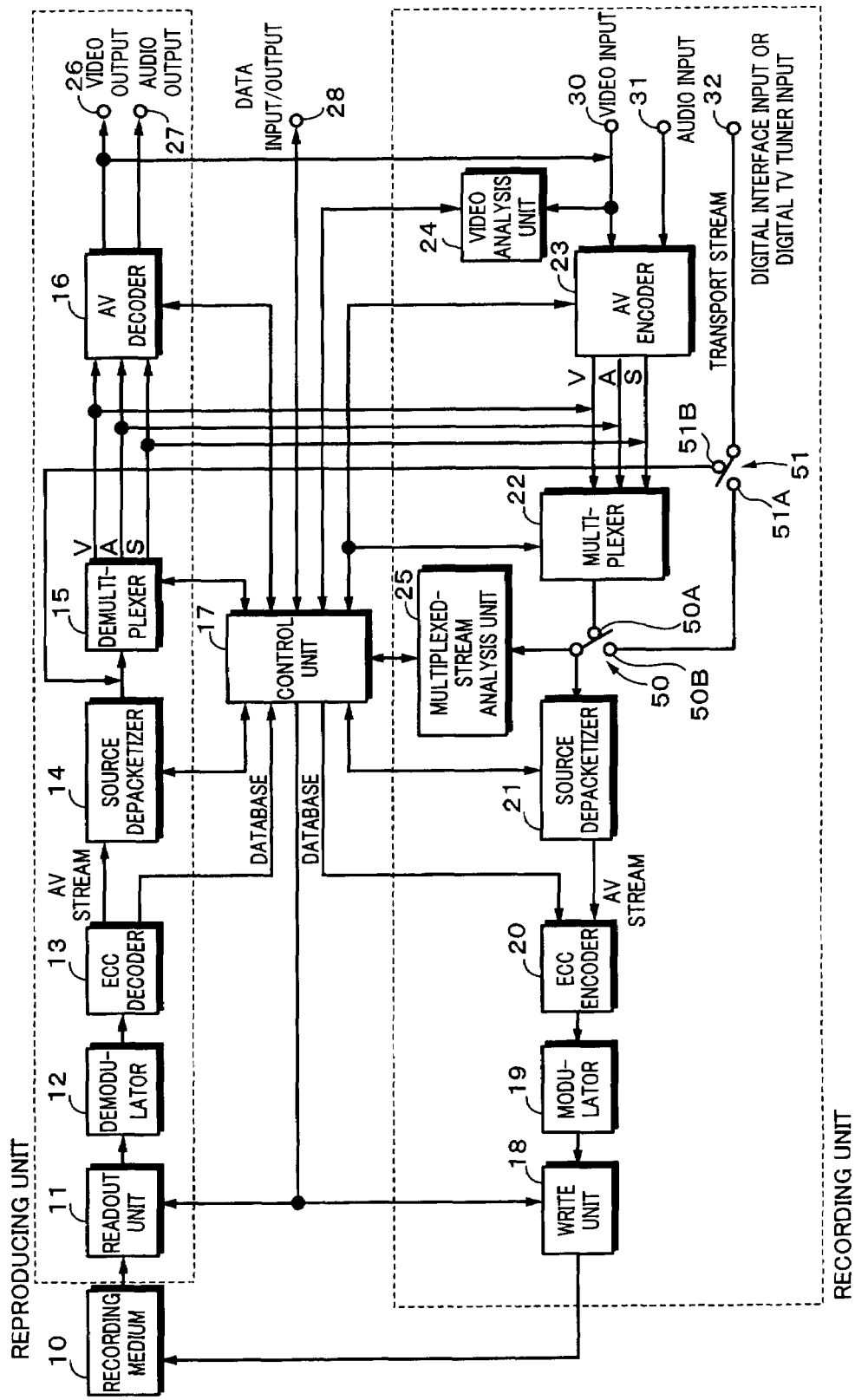
FIG. 28 is a block diagram depicting an exemplary configuration of a recording/reproducing apparatus that can be applied to one embodiment of the present invention.

FIG. 28 shows an exemplary configuration of a recording/reproducing apparatus that can be applied to the embodiment of the present invention. The recording/reproducing apparatus can be used as a recording/reproducing unit of a video camera device, for example. The recording/reproducing apparatus can also be configured as being independently used with out being limited thereto. Here, a description will be given assuming that the recording/reproducing apparatus is used as the recording/reproducing unit of the video camera device.

A control unit 17 includes, for example, a CPU, a ROM (Read Only Memory), and a RAM (Random Access Memory). The ROM stores in advance data necessary for programs or operations that operate on the CPU. The RAM is used as a work memory of the CPU. The CPU reads out the programs or data stored in the ROM when necessary, and controls the entire recording/reproducing apparatus while using the RAM as a work memory. The above-described BD virtual player is obtained by the control unit 17 in accordance with the programs stored in advance in the ROM, for example.

Equipment-specific information and data, etc. concerning record etc. which are input from a video camera unit (not shown) are input from an input/output terminal 28 to the recording/reproducing apparatus. These items of data input to the input/output terminal 28 are supplied to the control unit 17.

Operating elements such as a variety of switches and data output from a user interface (not shown) having display elements for simply making a display are output from the data input/output terminal 28. In addition, a display control signal generated by the control unit 17 is supplied to the user interface via the data input/output terminal 28. The user interface can also supply the display control signal to a monitor device, such as a television receiver, to display the supplied signal.

First, an operation made at the time of recording will be described here. A video signal obtained by image shooting is input to an input terminal 30 from a video camera unit (not shown), and an audio signal output along with the video signal is input to an input terminal 31. The input video signal and audio signal are supplied to an AV encoder 23. The video signal is also supplied to a video analysis unit 24. The AV encoder 23 encodes the input video signal and audio data in accordance with, for example, an MPEG2 scheme, and outputs an encoded video stream V, an encoded audio stream A, and system information S, respectively.

The AV encoder 23 encodes the audio signal in a format such as an MPEG1 audio stream format or a Dorby AC3 audio stream format. The system information S includes, for example, video signal or audio signal encoding information such as byte size of encoded picture or audio frame or picture encoding type, and time information relating to video and audio synchronization.

These encoded outputs of the AV encoder 23 are supplied to a multiplexer 22. The multiplexer 22 multiplexes the supplied encoded video stream V and encoded audio stream A on the basis of the system information S, and then, outputs a multiplexed stream based on an MPEG2 transport stream. In other words, the encoded video stream V, the encoded audio stream A, and the system information S are divided into sizes of payload of transport packets, respectively, and predetermined headers are added to them, to make transparent packets. In the header, PID is stored in a predetermined manner so that their respective data types and the like can be identified.

The multiplexed stream output from the multiplexer 22 is supplied to a source packetizer 21 and a multiplexed-stream analysis unit 25 described above via a switch 50 with a terminal 50A selected. The source packetizer 21 encodes the supplied multiplexed stream in accordance with an application format of a recording medium.

A clip AV stream encoded by the source packetizer 21 is error-corrected by an ECC (error correction coding) encoder unit 20, the error-corrected stream is modulated to a recording code by a modulator unit 19, and the modulated code is supplied to a write unit 18. The write unit 18 records the clip AV stream modulated to the recording code by the modulator unit 19 in a recordable recording medium 10 in response to an instruction of a control signal supplied from the control unit 17.

The recording/reproducing apparatus can directly input a transport stream obtained by multiplexing a clip AV stream, and record the input stream in a recording medium. For example, a transport stream by a digital television broadcast or the like, output from a digital interface or a digital television tuner, is input to an input terminal 32.

Examples of a method for recording the input transport stream may include a method for transparently recording the stream and a method for re-encoding and for the purpose of lowering a recording bit rate or the like and then recording the stream. An instruction indicating which of these two recording methods is used for recording is issued by means of, for example, an user operation relevant to a user interface, and a control signal according to this operation is supplied to the control unit 17 via the data input/output terminal 28. The control unit 17 controls each unit of the recording/reproducing apparatus on the basis of the control signal, and consequently, controls the recording method.

In the case where the input transport stream is recorded transparently, a terminal 50B is selected in the switch 50 and a terminal 51A is selected in a switch 51. The transport streams input from the input terminal 32 are supplied to the source packetizer 21 and the multiplexed-stream analysis unit 25, respectively, via the switches 51 and 50. The subsequent processes are identical to those in the case of encoding and recording the video signal and audio signal input to the input terminals 30 and 31 described above.

In the case where the input transport stream is re-encoded and recorded, on the other hand, a terminal 51B is selected in the switch 51, and the transport stream input from the input terminal 32 is supplied to a demultiplexer 15. The demultiplexer 15 demultiplexes the encoded video stream V, the encoded audio stream A, and the system information S that are multiplexed in the supplied transport stream, and supplies the encoded video stream V to an AV decoder 16 as well as supplies the encoded audio stream A and the system information S to the multiplexer 22.

An AV decoder 16 decodes the encoded video stream V supplied from the demultiplexer 15, and supplies the decoded video signal to the AV encoder 23. The AV encoder 23 encodes the thus supplied video signal as an encoded video stream V. The encoded video stream V is supplied to the multiplexer 22.

The multiplexer 22 multiplexes the encoded video stream V encoded and supplied by the AV encoder 23 and the encoded audio stream A demultiplexed by the demultiplexer 15 on the basis of the system information S also demultiplexed by the demultiplexer 15, and then, outputs a multiplexed stream. The subsequent processes are identical to those in the case of encoding and recording the video signal and audio signal that are input to the input terminals 30 and 31, described above.

The recording/reproducing apparatus records a clip AV stream file, as described above, in a recording medium 10 that conforms to the BD-RE standard, for example, and further records application database information associated with the clip AV stream file to be recorded. The application database information is created by the control unit 17 on the basis of feature information on movie images from the video analysis unit 24, feature information on clip AV streams from the multiplexed-stream analysis unit 25, and user instruction information input from the terminal 28.

The feature information on movie images, obtained from the video analysis unit 24, is information created in the recording/reproducing apparatus in the case where a video signal is encoded and recorded by the AV encoder 23. The video analysis unit 24 is supplied with a video signal input from the input terminal 30 or a video signal obtained by demultiplexing the transport stream input from the input terminal 32 with the demultiplexer 15 and then by decoding the demultiplexed transport stream with the AV decoder 16. The video analysis unit 24 analyzes the contents of the supplied video signal, and generates information on an image of characterizing mark points in the input video signal. For example, the video analysis unit 24 detects characterizing mark points such as a start point of a program in an input video signal, a scene change point, or start and end points of a CM (commercial) broadcast, to thereby obtain specifying information of the image of the detected mark points. In addition, a thumbnail image of the image of the mark points may be created. The thumbnail image is provided as an image of reduced size by subjecting actual image data to a decimating process or the like. A position of the thumbnail image on the clip AV stream can be indicated by PTS.

The specifying information of these images, thumbnail images, and positional information of the thumbnail images (for example, PTS) are supplied to the multiplexer 22 via the control unit 17. At the time of multiplexing an encoded picture obtained by encoding the image of the mark points instructed from the control unit 17, the multiplexer 22 returns address information, of the encoded picture on a clip AV stream, to the control unit. The control unit 17 associates types of characterizing images with address information of a corresponding encoded picture on a clip AV stream, and stores the associated result in a RAM, for example.

The feature information on the clip AV stream, obtained from the multiplexed-stream analysis unit 25, is information associated with encoding information on the clip AV stream to be recorded. The information is generated in the movie image recording/reproducing apparatus. For example, with respect to the clip AV stream, a time stamp of an entry point and address information corresponding thereto are included as the feature information on the clip AV stream. In addition, with respect to the clip AV stream, discontinuous information on system time clock (STC), change information on the contents of programs, and address information corresponding to an arrival time, or other information are included as the feature information on the clip AV stream.

In the case where the transport stream input from the input terminal 32 is recorded transparently, the multiplexed-stream analysis unit 25 detects a characterizing mark point image contained in the clip AV stream, and generates type and address information of the detected image. The information serves as data stored in a block "ClipMark" contained in a clip information file. In this manner, feature information on the clip AV stream obtained by the multiplexed-stream analysis unit 25 is stored in the clip information file that serves as a database of the clip AV stream. These items of information obtained by the multiplexed-stream analysis unit 25 are temporarily stored in a RAM of the control unit 17, for example.

A user instruction information issued to a user interface (not shown) is supplied from the data input/output terminal 28 to the control unit 17. The instruction information includes, for example, specification information of a reproducing section favored by the user in the clip AV stream, character strings for explaining the contents of the reproducing section, and time stamps in the clip AV stream of book mark points or resume points set at the user's favorite scenes. These items of the user instruction information are temporarily stored in the RAM of the control unit 17. On the recording medium 10, these items of the instruction information are stored in a database possessed by a PlayList.

The control unit 17 creates a clip AV stream database (clip information), a PlayList database (PlayList file), management information relevant to the recorded contents on a recording medium (index file), and thumbnail information on the basis of the above-described input information stored on a RAM, i.e., feature information on movie images obtained from the video analysis unit 24, feature information on clip AV streams obtained from the multiplexed-stream analysis unit 25, and the user instruction information input from the data input/output terminal 28.

Here, the control unit 17 can create extension data for extending an index file, a PlayList file, and/or a clip information file on the basis of equipment specific data or information concerning record that are input from the data input/output terminal 28 described above, at the time of creating an index file. Accordingly, the control unit 17 embeds extension data in a file in accordance with the processes as described with reference to the flow chart of FIG. 14, on the basis of the data input from the data input/output terminal 28.

These items of database information are read out from the RAM of the control unit 17. In the same manner as that for the clip AV stream, the readout items of the information are supplied from the control 17 to the ECC encoder unit 20 to be error-corrected, the error-corrected information is modulated to a recording code by the modulator unit 19, and the modulated code is supplied to the write unit 18. The write unit 18 records the database information modulated to the recording code on the recording medium 10 on the basis of a control signal supplied from the control unit 17.

If a clip AV stream is newly recorded on the recording/reproducing apparatus, a Real PlayList relevant to the newly recorded clip is created. In addition, a process for updating a file "index.bdmv" and a file "MovieObject.bdmv" is carried out in accordance with the procedures described with respect to FIGS. 20 to 25, and then, a menu is updated so as to reflect the new recording of the clip. These processes are automatically carried out together with the new recording of the clip.

Now, an operation made at the time of reproducing will be described here. On the recording medium 10, application database information including a clip AV stream file, a PlayList file, and an index file, and a MovieObject file, which are created in the same manner as in the operation made at the time of recording, are recorded. When the recording medium 10 is mounted on a drive unit (not shown), the control unit 17 first instructs the readout unit 11 to read out the application database information and the MovieObject file that have been recorded on the recording medium 10. Upon the receipt of this instruction, the readout unit 11 reads out the application database information and the MovieObject file from the recording medium 10. An output from the readout unit 11 is supplied to a demodulator unit 12.

The demodulator unit 12 demodulates the output from the readout unit 11 and decodes a recording code as digital data. An output from the demodulator unit 12 is supplied to an ECC decoder unit 13, an error correction code is decoded, and then, an error correcting process is carried out. The error-corrected application database information is supplied to the control unit 17.

The control unit 17 outputs a menu screen for displaying a list of titles recorded on the recording medium 10 to a user interface via the user interface input/output terminal 28 on the basis of the application database information and the MovieObject file. This menu screen is displayed in a predetermined manner at, for example, a display unit provided at the user interface. The user selects a desired title to be reproduced on the basis of the menu screen, then an operation is performed on the user interface such that the selected title is reproduced. A control signal according to this operation is output from the user interface, and is supplied to the control unit 17 via the terminal 28.

In response to the control signal, the control unit 17 instructs the readout unit 11 to read out a clip AV stream file necessary for reproducing the selected title, on the basis of the contents of the index file or MovieObject file. In accordance with this instruction, the readout unit 11 reads out the clip AV stream file from the recording medium 10. An output from the readout unit 11 is supplied to the demodulator unit 12. The demodulator unit 12 demodulates the supplied signal, decodes a recording code, outputs the decoded recording code as digital data, and supplies the output digital data to the ECC decoder unit 13. The ECC decoder unit 13 decodes an error correction code of the supplied digital data to carry out error correction. The error-corrected clip AV stream file is subjected to a process of a file system unit (not shown) provided by the control unit 17, and then, the processed stream file is supplied to a source depacketizer 14.

The source de-packetizer 14 converts the clip AV stream file recorded on the application format on the recording medium 10 to a stream of a format that can be input to a demultiplexer 15, under the control of the control unit 17. For example, the source depacketizer 14 breaks the MPEG2 transport stream reproduced from the recording medium 10, in units of source packets, removes a header from the source packet, and then transport-packetizes the source packet. The thus transport-packetized clip AV stream is supplied to the demultiplexer 15.

The demultiplexer 15 outputs a video stream V, an audio stream A, and system information S that configure a reproducing section (PlayItem) specified by the control unit 17, of the clip AV stream supplied from the source depacketizer 14, and supplies the streams and information to the AV decoder 16 under the control of the control unit 17. For example, the demultiplexer 15 screens the supplied transport packets based on PID, removes a transport header from a respective one of the screened packets, and outputs the header-removed packets. The AV decoder 16 decodes the supplied video stream V and audio stream A, and leads out the decoded reproducing video signal and reproducing audio signal to a video output terminal 26 and an audio output terminal 27, respectively.

While the foregoing description has been given to an extent such that the recording/reproducing apparatus shown in FIG. 28 is provided as an apparatus for recording the video data and audio data that are output from a video camera or the like on the recording medium 10, the apparatus is not limited thereto. For example, one embodiment of the present invention can be applied to an editor device designed to edit input video data and output the edited video data. Further, the configuration of FIG. 28 described above can be modified to make a recording apparatus from which constituent elements of the reproducing unit are eliminated. Furthermore, while the foregoing description has been given to an extent such that the recording medium 10 is provided as a disc-shaped recording medium that conforms to the BD-RE standard, the recording medium is not limited thereto. One embodiment of the present invention can be applied to another recording medium such as a semiconductor memory or a hard disk.

While the foregoing description has been given to an extent such that the recording/reproducing apparatus shown in FIG. 28 is configured as hardware, the apparatus is not limited thereto. In other words, the recording/reproducing apparatus can be configured as software, constituent elements other than mechanical portions such as a drive unit on which the recording medium 10 is to be mounted. In this case, the software is stored in advance in, for example, a ROM of the control unit 17. A movie image recording/reproducing apparatus can also be configured on a computer system such as a personal computer without being limited thereto. In this case, software for causing a computer system to run the movie image recording/reproducing apparatus is recorded and provided in a recording medium such as CD-ROM or DVD-ROM. In the case where a computer system can be connected via a network, the software can be provided via a network such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus for recording at least content data and reproducing control information for controlling reproducing of the content data, the recording apparatus comprising:
    a recording unit which records content data on a recording medium; and
    a control unit, including a processor, which controls generation of, with respect to the content data recorded on the recording medium, a clip information file that includes clip information indicating attribute information on the content data, a PlayList file that includes a PlayList for calling the clip information, an object file that includes an object for reproducing the content data by calling the PlayList file, and an index file that includes an index table for calling the object, wherein the control unit correlates a type, based on a purpose of creating the PlayList file, with the PlayList file as attribute information of the PlayList file to generate the type in the index file, the control unit generating playlist files being one of a real PlayList file, a virtual PlayList file, and a menu PlayList file, all filenames of real PlayList files, virtual PlayList files, and menu PlayList files having a same file extension, and the control unit configured to delete menu PlayList files when commanded during editing of playlist files.

2. The recording apparatus according to claim 1, wherein the control unit controls the menu PlayList file so as to correspond to a PlayList file for configuring a menu for selecting a title for reproducing the content data.

3. The recording apparatus according to claim 2, wherein the control unit controls a PlayList file for configuring the menu and a PlayList file for reproducing the title called from the menu so as to be independent of each other.

4. The recording apparatus according to claim 3, wherein the control unit controls the clip information file called by the PlayList file for configuring the menu and the clip information file called by the PlayList file for reproducing the title so as to be independent of each other.

5. The recording apparatus according to claim 2, wherein the control unit controls the title called from the menu to call only one of the PlayList file.

6. The recording apparatus according to claim 5, wherein the control unit controls the title to call the only one of the PlayList file via only one of the object.

7. The recording apparatus according to claim 2, wherein, at the time of adding or deleting the title, the control unit makes a control to delete the PlayList file and the object for reproducing the menu and then newly create the PlayList file and the object for reproducing the menu on the basis of a result of the adding or deleting the title.

8. The recording apparatus according to claim 1, wherein the control unit controls the real PlayList file so as to correspond to a PlayList file created to refer to the entire content data along with the recording of the content data in the recording medium.

9. The recording apparatus according to claim 8, wherein, when the real PlayList file is deleted, the control unit makes a control to delete the clip information file called from the PlayList file and the content data corresponding to the clip information file, along with the deletion of the PlayList file.

10. The recording apparatus according to claim 8, wherein, when part of a reproducing section indicated in the real PlayList file is deleted, the control unit makes a control to delete a section, which corresponds to the section deleted from the PlayList file, of the content data that corresponds to the clip information file called from the PlayList file.

11. The recording apparatus according to claim 1, wherein the control unit controls the virtual PlayList file so as to correspond to a PlayList file for referencing the content data that have already been referenced by another PlayList file.

12. The recording apparatus according to claim 11, wherein, even if the virtual PlayList file is deleted, the control unit controls the content data referenced by the PlayList file so as not to be deleted.

13. The recording apparatus according to claim 1, wherein all filenames of the real PlayList files, virtual PlayList files, and menu PlayList files have a file extension of "mpls".

14. The recording apparatus according to claim 1, wherein all of the playlist files of the real PlayList files, virtual PlayList files, and menu PlayList files are stored in a same directory.

15. A recording method for recording at least content data and reproducing control information for controlling reproducing of the content data on a recording medium, the method comprising:
    generating, by a processor, with respect to the content data recorded on the recording medium, a clip information file that includes clip information indicating attribute information on the content data, a PlayList file that includes a PlayList for calling the clip information, an object file that includes an object for reproducing the content data by calling the PlayList file, and an index file that includes an index table for calling the object;
    correlating a type, based on a purpose of creating the PlayList file, with the PlayList file as attribute information of the PlayList file to generate the type in the index file, the generating including generating playlist files being one of a real PlayList file, a virtual PlayList file, and a menu PlayList file all filenames of real PlayList files, virtual PlayList files, and menu PlayList files having a same file extension; and
    deleting menu PlayList files when commanded during editing of playlist files.

16. A non-transitory computer readable recording medium encoded with a recording program for causing a computer to execute a method for recording at least content data and reproducing control information for controlling reproducing of the content data on a recording medium, the recording method comprising:
    generating, by a processor, with respect to the content data recorded on the recording medium, a clip information file that includes clip information indicating attribute information on the content data, a PlayList file that includes a PlayList for calling the clip information, an object file that includes an object for reproducing the content data by calling the PlayList file, and an index file that includes an index table for calling the object;
    correlating a type, based on a purpose of creating the PlayList file, with the PlayList file as attribute information of the PlayList file to generate the type in the index file, the generating including generating playlist files being one of a real PlayList file, a virtual PlayList file, and a menu PlayList file all filenames of real PlayList files, virtual PlayList files, and menu PlayList files having a same file extension; and deleting menu PlayList files when commanded during editing of playlist files.

* * * * *